(12) United States Patent
Ledbetter et al.

(10) Patent No.: US 12,431,266 B1
(45) Date of Patent: Sep. 30, 2025

(54) NON-CIRCULAR ELECTRICAL CABLE HAVING A REDUCED PULLING FORCE

(71) Applicant: Southwire Company, LLC, Carrollton, GA (US)

(72) Inventors: Scotty Ledbetter, Bowdon, GA (US); Randy Deon Kummer, Villa Rica, GA (US)

(73) Assignee: Southwire Company, LLC, Carrollton, GA (US)

( * ) Notice: Subject to any disclaimer, the term of this patent is extended or adjusted under 35 U.S.C. 154(b) by 555 days.

(21) Appl. No.: 17/661,592

(22) Filed: May 2, 2022

Related U.S. Application Data

(63) Continuation of application No. 16/918,688, filed on Jul. 1, 2020, now Pat. No. 11,348,707, which is a (Continued)

(51) Int. Cl.
*H01B 13/24* (2006.01)
*B29C 48/06* (2019.01)
(Continued)

(52) U.S. Cl.
CPC ............ *H01B 13/24* (2013.01); *B29C 48/06* (2019.02); *H01B 7/08* (2013.01); *H01B 7/187* (2013.01); *H01B 7/1875* (2013.01)

(58) Field of Classification Search
CPC .... H01B 13/24; H01B 13/141; H01B 13/145; H01B 7/08; H01B 7/187; H01B 7/1875; H01B 7/0275; H01B 7/0216; B29C 48/06
See application file for complete search history.

(56) References Cited

U.S. PATENT DOCUMENTS 2,276,437 A  3/1942 Vaala
2,685,707 A  8/1954 Llewellyn et al.
(Continued)

FOREIGN PATENT DOCUMENTS

AU  2006335277 A1  7/2007
BR  PI-0609987 A2  11/2010
(Continued)

OTHER PUBLICATIONS

Translation of CN-202084348-U (Year: 2011).*
(Continued)

*Primary Examiner* — Jeffrey T Carley
(74) *Attorney, Agent, or Firm* — Alston & Bird LLP

(57) ABSTRACT

In various embodiments, a non-circular electrical cable having a reduced pulling force attributable to the exterior surface of an outer sheath, and method of producing the same is provided. In various embodiments, an outer sheath of the cable may comprise a first and second sheath layer, the second sheath layer being located external to the first sheath layer, and comprising a nylon material configured to reduce the pulling force necessary for installing the cable. In various embodiments, the first sheath layer may be extruded using a tube extrusion method into a substantially circular shape, and the second sheath layer may be extruded using a pressure extrusion methods onto the exterior surface of the first sheath layer while maintaining the at least substantially circular shape of the sheath. The sheath may then be pulled onto the surface of a plurality of conductors to form the non-circular electrical cable.

11 Claims, 7 Drawing Sheets

Related U.S. Application Data continuation of application No. 15/840,911, filed on Dec. 13, 2017, now Pat. No. 10,741,310, which is a continuation of application No. 14/620,963, filed on Feb. 12, 2015, now Pat. No. 10,431,350.

(51) Int. Cl.
*H01B 7/08* (2006.01)
*H01B 7/18* (2006.01)

(56) References Cited

U.S. PATENT DOCUMENTS

| | | | |
|---|---|---|---|
| 2,717,515 A | 9/1955 | Pesante | |
| 2,851,515 A | 9/1958 | Kolmorgen et al. | |
| 2,930,838 A | 3/1960 | Chizallet et al. | |
| 2,956,311 A * | 10/1960 | Raydt | B29C 48/12 |
| | | | 156/244.14 |
| 3,064,073 A | 11/1962 | Downing et al. | |
| 3,106,981 A | 10/1963 | Chakiris | |
| 3,108,981 A | 10/1963 | Clark et al. | |
| 3,191,005 A | 6/1965 | Cox, II | |
| 3,258,031 A | 6/1966 | French | |
| 3,261,785 A * | 7/1966 | Robinson | C08F 8/34 |
| | | | 525/329.2 |
| 3,333,037 A | 7/1967 | Humphrey et al. | |
| 3,378,628 A | 4/1968 | Garner | |
| 3,433,884 A | 3/1969 | Cogelia et al. | |
| 3,668,175 A | 6/1972 | Sattler | |
| 3,686,436 A | 8/1972 | Camras | |
| 3,747,428 A | 7/1973 | Waner et al. | |
| 3,849,221 A | 11/1974 | Middleton | |
| 3,852,875 A | 12/1974 | McAmis et al. | |
| 3,858,687 A | 1/1975 | Masarky et al. | |
| 3,868,436 A | 2/1975 | Ootsuji et al. | |
| 3,877,142 A | 4/1975 | Hamano et al. | |
| 3,878,317 A * | 4/1975 | Plaskon | B29C 61/10 |
| | | | 174/76 |
| 3,885,286 A | 5/1975 | Hill | |
| 3,925,216 A | 12/1975 | Moorhouse | |
| 3,936,572 A | 2/1976 | Mackenzie, Jr. et al. | |
| 4,002,797 A | 1/1977 | Hacker et al. | |
| 4,043,851 A | 8/1977 | Holladay et al. | |
| 4,057,956 A | 11/1977 | Tolle | |
| 4,099,425 A | 7/1978 | Moore | |
| 4,100,245 A | 7/1978 | Horikawa et al. | |
| 4,137,623 A | 2/1979 | Taylor | |
| 4,221,756 A * | 9/1980 | Piper | H01B 13/144 |
| | | | 425/114 |
| 4,273,806 A | 6/1981 | Stechler | |
| 4,274,509 A | 6/1981 | Thomson et al. | |
| 4,275,096 A | 6/1981 | Taylor | |
| 4,299,256 A | 11/1981 | Bacehowski et al. | |
| 4,313,645 A | 2/1982 | Cocco | |
| 4,356,139 A | 10/1982 | Rowland et al. | |
| 4,360,492 A | 11/1982 | Rowland et al. | |
| 4,401,361 A | 8/1983 | Slaughter | |
| 4,416,380 A | 11/1983 | Flum | |
| 4,425,292 A * | 1/1984 | Kanotz | B29C 48/06 |
| | | | 425/114 |
| 4,454,949 A | 6/1984 | Flum | |
| 4,469,538 A * | 9/1984 | Wade | H01B 13/148 |
| | | | 156/298 |
| 4,522,733 A | 6/1985 | Jonnes | |
| 4,546,041 A | 10/1985 | Keane et al. | |
| 4,547,246 A | 10/1985 | Viriyayuthakorn et al. | |
| 4,568,420 A | 2/1986 | Nonni | |
| 4,569,420 A | 2/1986 | Pickett et al. | |
| 4,605,818 A | 8/1986 | Arroyo et al. | |
| 4,673,516 A | 6/1987 | Berry | |
| 4,684,214 A | 8/1987 | Goldmann et al. | |
| 4,693,936 A | 9/1987 | McGregor et al. | |
| 4,749,059 A | 6/1988 | Jonnes et al. | |
| 4,751,261 A | 6/1988 | Miyata et al. | |
| 4,761,445 A | 8/1988 | Chiba | |
| 4,770,902 A | 9/1988 | Barlow et al. | |
| 4,773,954 A * | 9/1988 | Starnes, Jr. | B29C 48/86 |
| | | | 264/262 |
| 4,806,425 A | 2/1989 | Chu-Ba | |
| 4,868,054 A | 9/1989 | Kartheiser | |
| 4,877,815 A * | 10/1989 | Buckmaster | C08J 9/0033 |
| | | | 521/85 |
| 4,895,221 A | 1/1990 | Carlson | |
| 4,910,359 A * | 3/1990 | Dougherty | H01B 7/065 |
| | | | 174/110 V |
| 4,937,142 A | 6/1990 | Ogushi et al. | |
| 4,940,504 A * | 7/1990 | Starnes, Jr. | B29C 48/06 |
| | | | 264/262 |
| 4,952,021 A | 8/1990 | Aoki et al. | |
| 4,965,249 A | 10/1990 | De With et al. | |
| 5,036,121 A | 7/1991 | Coaker et al. | |
| 5,055,522 A | 10/1991 | Ikeda et al. | |
| 5,074,640 A | 12/1991 | Hardin et al. | |
| 5,156,715 A | 10/1992 | Starnes, Jr. | |
| 5,225,635 A | 7/1993 | Wake et al. | |
| 5,227,080 A | 7/1993 | Berry | |
| 5,252,676 A | 10/1993 | Suyama et al. | |
| 5,324,588 A | 6/1994 | Rinehart et al. | |
| 5,326,638 A | 7/1994 | Mottine, Jr. et al. | |
| 5,346,383 A | 9/1994 | Starnes, Jr. | |
| 5,356,710 A | 10/1994 | Rinehart | |
| 5,383,799 A | 1/1995 | Fladung | |
| 5,422,385 A | 6/1995 | Farkas | |
| 5,457,288 A | 10/1995 | Olsson | |
| 5,460,885 A | 10/1995 | Chu-Ba | |
| 5,492,760 A | 2/1996 | Sarma et al. | |
| 5,505,900 A | 4/1996 | Suwanda et al. | |
| 5,523,354 A | 6/1996 | Kaufmann et al. | |
| 5,561,730 A * | 10/1996 | Lochkovic | G02B 6/4408 |
| | | | 385/128 |
| 5,565,242 A | 10/1996 | Buttrick, Jr. et al. | |
| 5,614,288 A | 3/1997 | Bustos | |
| 5,614,482 A | 3/1997 | Baker et al. | |
| 5,656,371 A | 8/1997 | Kawahigashi et al. | |
| 5,658,406 A * | 8/1997 | Walling | B29C 48/156 |
| | | | 156/244.12 |
| 5,660,932 A | 8/1997 | Durston et al. | |
| 5,708,084 A | 1/1998 | Hauerstein et al. | |
| 5,733,823 A | 3/1998 | Sugioka et al. | |
| 5,741,858 A | 4/1998 | Brann et al. | |
| 5,753,861 A | 5/1998 | Hansen et al. | |
| 5,852,116 A | 12/1998 | Cree et al. | |
| 5,856,405 A | 1/1999 | Hofmann | |
| 5,886,072 A | 3/1999 | Linsky et al. | |
| 5,895,889 A * | 4/1999 | Uchida | B60R 16/0207 |
| | | | 174/72 A |
| 5,912,436 A | 6/1999 | Sanchez et al. | |
| 5,925,601 A | 7/1999 | McSherry et al. | |
| 6,017,477 A * | 1/2000 | Lu | B29C 37/005 |
| | | | 264/173.17 |
| 6,019,628 A | 2/2000 | Shinchi | |
| 6,057,018 A | 5/2000 | Schmidt | |
| 6,064,073 A | 5/2000 | Hoogenraad et al. | |
| 6,080,489 A | 6/2000 | Mehta | |
| 6,114,036 A | 9/2000 | Rinehart et al. | |
| 6,137,058 A | 10/2000 | Moe et al. | |
| 6,146,699 A | 11/2000 | Bonicel et al. | |
| 6,159,617 A | 12/2000 | Foster et al. | |
| 6,160,940 A | 12/2000 | Summers et al. | |
| 6,179,665 B1 | 1/2001 | Rossman et al. | |
| 6,188,026 B1 | 2/2001 | Cope et al. | |
| 6,215,068 B1 | 4/2001 | Meier | |
| 6,228,495 B1 | 5/2001 | Lupia et al. | |
| 6,235,990 B1 | 5/2001 | Morris et al. | |
| 6,270,849 B1 | 8/2001 | Popoola et al. | |
| 6,281,431 B1 | 8/2001 | Cumley | |
| 6,327,841 B1 | 12/2001 | Bertini et al. | |
| 6,347,561 B2 | 2/2002 | Uneme et al. | |
| 6,392,155 B1 * | 5/2002 | Shimizu | H01B 7/0838 |
| | | | 174/117 F |
| 6,395,989 B2 | 5/2002 | Lecoeuvre et al. | |
| 6,416,813 B1 | 7/2002 | Valls Prats et al. | |
| 6,418,704 B2 | 7/2002 | Bertini et al. | |

(56) References Cited

U.S. PATENT DOCUMENTS

| | | | |
|---|---|---|---|
| 6,461,730 B1 | 10/2002 | Bachmann et al. | |
| 6,474,057 B2 | 11/2002 | Bertini et al. | |
| 6,485,325 B1 | 11/2002 | Fukuda | |
| 6,512,869 B1* | 1/2003 | Imayama | G02B 6/4431 |
| | | | 385/114 |
| 6,534,717 B2 | 3/2003 | Suzuki et al. | |
| 6,565,242 B2 | 5/2003 | Dai et al. | |
| 6,640,533 B2 | 11/2003 | Bertini et al. | |
| 6,646,205 B2 | 11/2003 | Hase et al. | |
| 6,810,188 B1 | 10/2004 | Suzuki et al. | |
| 6,850,681 B2 | 2/2005 | Lepont et al. | |
| 6,852,412 B2 | 2/2005 | Keogh | |
| 6,864,420 B2 | 3/2005 | Li | |
| 6,897,382 B2 | 5/2005 | Hager et al. | |
| 6,903,264 B2 | 6/2005 | Watanabe et al. | |
| 6,906,258 B2 | 6/2005 | Hirai et al. | |
| 6,924,031 B2 | 8/2005 | Grizante Redondo et al. | |
| 6,977,280 B2 | 12/2005 | Lee et al. | |
| 7,049,506 B2* | 5/2006 | Head | B29C 48/151 |
| | | | 174/102 R |
| 7,053,308 B2 | 5/2006 | Prats et al. | |
| 7,136,556 B2 | 11/2006 | Brown et al. | |
| 7,144,952 B1 | 12/2006 | Court et al. | |
| 7,411,129 B2 | 8/2008 | Kummer et al. | |
| 7,447,406 B2 | 11/2008 | Sutehall et al. | |
| 7,557,301 B2 | 7/2009 | Kummer et al. | |
| 7,749,024 B2 | 7/2010 | Chambers et al. | |
| 8,043,119 B2 | 10/2011 | Kummer et al. | |
| 8,124,875 B2 | 2/2012 | Aitken et al. | |
| 8,378,009 B2 | 2/2013 | Inagaki et al. | |
| 8,382,518 B2 | 2/2013 | Chambers et al. | |
| 8,616,918 B2 | 12/2013 | Chambers et al. | |
| 8,620,124 B1* | 12/2013 | Blazer | G02B 6/4413 |
| | | | 385/102 |
| 8,658,576 B1 | 2/2014 | Bigbee, Jr. et al. | |
| 8,701,277 B2 | 4/2014 | Kummer et al. | |
| 8,800,967 B2 | 8/2014 | Carlson et al. | |
| 8,844,905 B2 | 9/2014 | Carlson et al. | |
| 8,883,917 B1 | 11/2014 | Davie et al. | |
| 8,912,253 B2 | 12/2014 | Montes et al. | |
| 8,986,586 B2 | 3/2015 | Sasse et al. | |
| 9,352,371 B1 | 5/2016 | Bigbee et al. | |
| 7,749,024 C1 | 7/2016 | Chambers et al. | |
| 9,412,495 B1 | 8/2016 | Bennett et al. | |
| 9,431,152 B2 | 8/2016 | Sasse et al. | |
| 9,547,147 B2* | 1/2017 | Bringuier | G02B 6/4494 |
| 9,587,201 B2 | 3/2017 | Tomsheck et al. | |
| 7,411,129 C1 | 9/2017 | Kummer et al. | |
| 9,922,756 B1 | 3/2018 | Smith et al. | |
| 10,431,350 B1 | 10/2019 | Ledbetter et al. | |
| 10,741,310 B1 | 8/2020 | Ledbetter et al. | |
| 11,355,264 B2 | 6/2022 | Sasse et al. | |
| 2002/0002221 A1 | 1/2002 | Lee | |
| 2002/0010252 A1 | 1/2002 | Lecoeuvre et al. | |
| 2002/0026709 A1* | 3/2002 | Reichinger | B60R 16/0207 |
| | | | 156/289 |
| 2002/0043391 A1 | 4/2002 | Suzuki et al. | |
| 2003/0098176 A1 | 5/2003 | Mesaki et al. | |
| 2003/0128941 A1* | 7/2003 | Lanier | G02B 6/443 |
| | | | 385/100 |
| 2003/0161596 A1 | 8/2003 | Register, III et al. | |
| 2003/0195279 A1 | 10/2003 | Shah et al. | |
| 2003/0234472 A1 | 12/2003 | Bolcar | |
| 2004/0001682 A1 | 1/2004 | Beuth et al. | |
| 2004/0007308 A1 | 1/2004 | Houston et al. | |
| 2004/0016503 A1* | 1/2004 | Stowe | B29C 48/06 |
| | | | 156/244.14 |
| 2004/0198909 A1 | 10/2004 | Breitscheidel et al. | |
| 2004/0254299 A1 | 12/2004 | Lee et al. | |
| 2005/0019353 A1 | 1/2005 | Prinz et al. | |
| 2005/0023029 A1 | 2/2005 | Mammeri et al. | |
| 2005/0036753 A1 | 2/2005 | Will et al. | |
| 2005/0046073 A1* | 3/2005 | Balconi | B29C 48/06 |
| | | | 264/171.23 |
| 2005/0180725 A1 | 8/2005 | Carlson et al. | |
| 2006/0032661 A1 | 2/2006 | Gai | |
| 2006/0065427 A1 | 3/2006 | Kummer et al. | |
| 2006/0065428 A1 | 3/2006 | Kummer et al. | |
| 2006/0065430 A1 | 3/2006 | Kummer | |
| 2006/0068085 A1 | 3/2006 | Reece et al. | |
| 2006/0068086 A1 | 3/2006 | Reece et al. | |
| 2006/0088657 A1 | 4/2006 | Reece et al. | |
| 2006/0151196 A1 | 7/2006 | Kummer et al. | |
| 2006/0157303 A1 | 7/2006 | Reese et al. | |
| 2006/0191621 A1 | 8/2006 | Kummer et al. | |
| 2006/0249298 A1 | 11/2006 | Reece et al. | |
| 2006/0249299 A1 | 11/2006 | Kummer et al. | |
| 2006/0251802 A1 | 11/2006 | Kummer et al. | |
| 2007/0098340 A1 | 5/2007 | Lee et al. | |
| 2007/0243761 A1* | 10/2007 | Chambers | H01B 3/443 |
| | | | 439/587 |
| 2008/0066946 A1 | 3/2008 | Kummer et al. | |
| 2008/0128939 A1* | 6/2008 | Dell' Anna | H01B 13/143 |
| | | | 264/104 |
| 2008/0257599 A1 | 10/2008 | Matsushita et al. | |
| 2008/0264671 A1* | 10/2008 | Kenny | H01B 7/1805 |
| | | | 174/120 SR |
| 2008/0317990 A1 | 12/2008 | Runyan et al. | |
| 2009/0181207 A1* | 7/2009 | Michalik | B29C 48/07 |
| | | | 264/176.1 |
| 2009/0233052 A1* | 9/2009 | Thuot | H01B 3/30 |
| | | | 425/461 |
| 2009/0297104 A1* | 12/2009 | Kachmar | G02B 6/4429 |
| | | | 385/100 |
| 2010/0000753 A1* | 1/2010 | Juengst | H01B 11/002 |
| | | | 174/24 |
| 2010/0078843 A1* | 4/2010 | Burros | B29C 48/92 |
| | | | 264/40.7 |
| 2010/0136269 A1* | 6/2010 | Andersen | B28B 11/003 |
| | | | 428/34.4 |
| 2010/0230134 A1 | 9/2010 | Chambers et al. | |
| 2010/0236045 A1 | 9/2010 | Galindo et al. | |
| 2010/0236811 A1 | 9/2010 | Sasse et al. | |
| 2010/0326695 A1* | 12/2010 | Dion | H01B 13/262 |
| | | | 174/102 R |
| 2011/0226508 A1* | 9/2011 | Aoi | C08L 81/02 |
| | | | 174/120 SR |
| 2012/0031642 A1 | 2/2012 | Chambers et al. | |
| 2013/0037304 A1 | 2/2013 | Ikeda et al. | |
| 2013/0153261 A1 | 6/2013 | Bremser et al. | |
| 2013/0160286 A1 | 6/2013 | Chambers et al. | |
| 2013/0218325 A1 | 8/2013 | Carlson et al. | |
| 2013/0233589 A1* | 9/2013 | Kaga | H01B 7/00 |
| | | | 29/868 |
| 2014/0053389 A1 | 2/2014 | Galindo et al. | |
| 2014/0113069 A1 | 4/2014 | Kummer et al. | |
| 2015/0014468 A1 | 1/2015 | Carlson et al. | |
| 2015/0034891 A1 | 2/2015 | Carlson et al. | |
| 2015/0144218 A1* | 5/2015 | Morrow | B29C 48/06 |
| | | | 138/111 |
| 2016/0012945 A1 | 1/2016 | Sasse et al. | |
| 2017/0243674 A1 | 8/2017 | Sasse et al. | |
| 2018/0301240 A1 | 10/2018 | Sasse et al. | |
| 2020/0303090 A1 | 9/2020 | Sasse et al. | |
| 2021/0217539 A1 | 7/2021 | Sasse et al. | |

FOREIGN PATENT DOCUMENTS

| | | | |
|---|---|---|---|
| CA | 2614485 A1 | 2/2006 | |
| CA | 2726607 A1 | 12/2009 | |
| CA | 2755343 A1 | 9/2010 | |
| CA | 2774428 A1 | 4/2011 | |
| CN | 101223609 A | 7/2008 | |
| CN | 202084348 U | * 12/2011 | |
| CN | 202917210 U | 5/2013 | |
| CN | 203110295 U | * 8/2013 | |
| DE | 2528307 A1 | 1/1977 | |
| DE | 4410456 A1 | 9/1995 | |
| DO | P-2011000290 A | 2/2012 | |
| EA | 016504 B1 | 5/2012 | |
| EG | 25128 A | 9/2011 | |
| EP | 0283132 A2 | 9/1988 | |

(56) References Cited

FOREIGN PATENT DOCUMENTS

| | | |
|---|---|---|
| EP | 0364717 A1 | 4/1990 |
| EP | 0544411 A1 | 6/1993 |
| EP | 1524294 A1 | 4/2005 |
| EP | 1899987 A1 | 3/2008 |
| EP | 1899988 A2 | 3/2008 |
| ES | 2402777 T3 | 5/2013 |
| FR | 2631884 A1 * | 12/1989 |
| FR | 2674364 A1 | 9/1992 |
| HK | 1113611 A1 | 10/2008 |
| IN | 9500996 14 | 3/2010 |
| JP | 59-159708 A | 9/1984 |
| JP | 61-076409 A | 4/1986 |
| JP | 61-76409 U | 5/1986 |
| JP | S61-133506 A | 6/1986 |
| JP | S61-133507 A | 6/1986 |
| JP | 63-094503 U | 6/1988 |
| JP | 63-216220 A | 9/1988 |
| JP | 1-110013 A | 4/1989 |
| JP | 1-144504 A | 6/1989 |
| JP | 1-166410 A | 6/1989 |
| JP | 1-307110 A | 12/1989 |
| JP | 5-266720 A | 10/1993 |
| JP | 6-057145 A | 3/1994 |
| JP | 7-134913 A | 5/1995 |
| JP | 08-222041 A | 8/1996 |
| JP | 9-045143 A | 2/1997 |
| JP | 9-180558 A | 7/1997 |
| JP | 9-251811 A | 9/1997 |
| JP | 10-012051 A | 1/1998 |
| JP | 10-086207 A | 4/1998 |
| JP | 2000-120922 A | 4/2000 |
| JP | 2001-026401 A | 1/2001 |
| JP | 2001-031903 A | 2/2001 |
| JP | 2001-052536 A | 2/2001 |
| JP | 2001-256836 A | 9/2001 |
| JP | 2001-264601 A | 9/2001 |
| JP | 2002-128963 A | 5/2002 |
| JP | 2002-231065 A | 8/2002 |
| JP | 2002-324438 A | 8/2002 |
| JP | 2002-313153 A | 10/2002 |
| JP | 2003-323820 A | 11/2003 |
| JP | 2009-503765 A | 1/2009 |
| JP | 2013-251270 A | 12/2013 |
| KR | 2008041151 A | 5/2008 |
| KR | 2013056283 A | 5/2013 |
| MX | 2007014798 A | 5/2008 |
| MX | 2011010044 A | 1/2012 |
| NZ | 564551 A | 3/2011 |
| SG | 161929 A1 | 6/2010 |
| WO | WO-1989/000763 A1 | 1/1989 |
| WO | WO-1991/008262 A2 | 6/1991 |
| WO | WO-2000/040653 A1 | 7/2000 |
| WO | WO-2001/081969 A1 | 11/2001 |
| WO | WO-2001/090230 A1 | 11/2001 |
| WO | WO-2005/042226 A1 | 5/2005 |
| WO | WO-2006/016895 A1 | 2/2006 |
| WO | WO-2006/016896 A1 | 2/2006 |
| WO | WO-2006/118702 A2 | 11/2006 |
| WO | WO-2006/127711 A2 | 11/2006 |
| WO | WO-2006/135467 A1 | 12/2006 |
| WO | WO-2007/081372 A1 | 7/2007 |
| WO | WO-2007/084745 A2 | 7/2007 |
| WO | WO-2008/146921 A1 | 12/2008 |
| WO | WO-2010/111167 A1 | 9/2010 |
| WO | WO-2011/046998 A1 | 4/2011 |
| ZA | 200711170 A | 8/2009 |

OTHER PUBLICATIONS

Translation of CN-203110295-U (Year: 2013).*
Translation of FR-2631884-A1 (Year: 1988).*
Notice of Allowance and Fee(s) Due for U.S. Appl. No. 17/661,697, dated Oct. 5, 2022, (66 pages), United States Patent and Trademark Office, USA.
NonFinal Office Action for U.S. Appl. No. 18/046,639, dated Jun. 23, 2023, (6 pages), United States Patent and Trademark Office, US.
NonFinal Office Action for U.S. Appl. No. 18/062,222, dated Jun. 23, 2023, (6 pages), United States Patent and Trademark Office, US.
Notice of Allowance and Fee(s) Due for U.S. Appl. No. 17/217,530, dated Feb. 2, 2022, (5 pages), United States Patent and Trademark Office, USA.
Supplemental Notice of Allowability for U.S. Appl. No. 17/217,530, dated May 2, 2022, (3 pages), United States Patent and Trademark Office, USA.
U.S. Appl. No. 16/918,688, filed Jul. 1, 2020, Allowed.
U.S. Appl. No. 15/840,911, U.S. Pat. No. 10,741,310, filed Dec. 13, 2017, Issued.
U.S. Appl. No. 14/620,963, U.S. Pat. No. 10,431,350, filed Feb. 12, 2015, Issued.
American Polywater Corporation, "www.polywater.com/3000tech.html", Copyright 2001-2015, Jan. 6, 2009 to Jul. 27, 2015 Internet Archive <http://web.archive.org/web/*/http://www.polywater.com/3000tech.html>, 4 page.
American Polywater Corporation, "www.polywater.com/techtak1.html" Copyright 2001-2015, Dec. 21, 1997 to Jul. 29, 2015 Internet Archive <http://web.archive.org/web/*/http://www.polywater.com/techtak1.html>, 5 pages.
Axel Plastics Research Laboratories, Inc., Product Data Sheet re "Mold Wiz, INT-40DHT" (Approx. 2001) (1p).
Axel Plastics Research Laboratories, Inc., Product Data Sheet re "Mold Wiz, INT-40GHT" (Approx. 2001) (1p).
Axel Plastics Research Laboratories, Inc., Product Data Sheet re "Mold Wiz, INT-33PA" (Approx. 2000) (1p).
Cerro Wire Inc., Appeal Brief in Inter Partes Reexamination of U.S. Pat. No. 8,043,119 (U.S. Appl. No. 95/000,695), Dec. 10, 2014, 135 pages, U.S.
Cerro Wire Inc., Appeal Brief in Inter Partes Reexamination of U.S. Pat. No. 7,557,301 (U.S. Appl. No. 95/000,696), Jun. 3, 2014, 76 pages, U.S.
Cerro Wire Inc., Corrected Respondent Brief in Inter Partes Reexamination of U.S. Pat. No. 7,411,129 (U.S. Appl. No. 95/000,403), Dec. 10, 2010, 16 pages, U.S.
Cerro Wire Inc., Notice of Cross Appeal in Inter Partes Reexamination of U.S. Pat. No. 7,557,301 (U.S. Appl. No. 95/000,696), Apr. 4, 2014, 1 pages, U.S.
Cerro Wire Inc., Notice of Cross-Appeal to U.S. Court of Appeals for the Federal Circuit in Inter Partes Reexamination of U.S. Pat. No. 7,749,024 (U.S. Appl. No. 95/000,594), Sep. 29, 2014, 4 pages, U.S.
Cerro Wire Inc., Rebuttal Brief in Inter Partes Reexamination of U.S. Pat. No. 7,411,129 (U.S. Appl. No. 95/000,403), Oct. 22, 2012, 18 pages, U.S.
Cerro Wire Inc., Rebuttal Brief in Inter Partes Reexamination of U.S. Pat. No. 7,749,024 (U.S. Appl. No. 95/000,594), Jan. 6, 2014, 18 pages, U.S.
Cerro Wire Inc., Rebuttal Brief in Inter Partes Reexamination of U.S. Pat. No. 8,043,119 (U.S. Appl. No. 95/000,695), Mar. 4, 2015, 18 pages, U.S.
Cerro Wire Inc., Rebuttal Brief on Appeal by Appellant Requestor in Inter Partes Reexamination of U.S. Pat. No. 7,557,301 (U.S. Appl. No. 95/000,696), Sep. 29, 2014, 14 pages, U.S.
Cerro Wire Inc., Request for Ex Parte Examination of U.S. Pat. No. 7,557,301 (U.S. Appl. No. 90/009,589), Oct. 1, 2009, 380 pages, U.S.
Cerro Wire Inc., Request for Inter Partes Reexamination of U.S. Pat. No. 7,411,129 (U.S. Appl. No. 95/000,403), Sep. 26, 2008, 112 pages, U.S.
Cerro Wire Inc., Request for Inter Partes Reexamination of U.S. Pat. No. 7,749,024 (U.S. Appl. No. 95/000,594), Nov. 17, 2010, 63 pages, U.S.
Cerro Wire Inc., Request for Inter Partes Reexamination of U.S. Pat. No. 8,043,119 (U.S. Appl. No. 95/000,695), Sep. 14, 2012, 95 pages, U.S.
Cerro Wire Inc., Request for Rehearing in Inter Partes Reexamination of U.S. Pat. No. 8,043,119 (U.S. Appl. No. 95/000,695), Feb. 16, 2018, 15 pages, U.S.A.

(56) References Cited

OTHER PUBLICATIONS

Cerro Wire Inc., Requester Comments on Patent Owner Response after Board Decision, including Exhibits, in Inter Partes Reexamination of U.S. Pat. No. 8,043,119 (U.S. Appl. No. 95/000,695), Mar. 15, 2018, 122 pages, U.S.A.
Cerro Wire Inc., Requestor Comments in Response to Examiner's Determination after Board Decision for Control No. U.S. Appl. No. 95/000,695, filed Dec. 13, 2018, 18 pages, USA.
Cerro Wire Inc., Respondent Brief by Third Party Requestor in Inter Partes Reexamination of U.S. Pat. No. 7,557,301 (U.S. Appl. No. 95/000,696), Jul. 30, 2014, 95 pages, U.S.
Cerro Wire Inc., Respondent Brief in Inter Partes Reexamination of U.S. Pat. No. 7,411,129 (U.S. Appl. No. 95/000,403), Oct. 13, 2010, 30 pages, U.S.
Cerro Wire Inc., Respondent Brief in Inter Partes Reexamination of U.S. Pat. No. 8,043,119 (U.S. Appl. No. 95/000,695), Jan. 12, 2015, 136 pages, U.S.
Cerro Wire Inc., Response in Inter Partes Reexamination of U.S. Pat. No. 7,411,129 (U.S. Appl. No. 95/000,403), Mar. 4, 2009, 44 pages, U.S.
Cerro Wire Inc., Response in Inter Partes Reexamination of U.S. Pat. No. 7,411,129 (U.S. Appl. No. 95/000,403), Sep. 30, 2009, 38 pages, U.S.
Cerro Wire Inc., Response in Inter Partes Reexamination of U.S. Pat. No. 7,411,129 (U.S. Appl. No. 95/000,403), May 14, 2010, 7 pages, U.S.
Cerro Wire Inc., Response in Inter Partes Reexamination of U.S. Pat. No. 7,411,129 (U.S. Appl. No. 95/000,403), Jun. 1, 2010, 9 pages, U.S.
Cerro Wire Inc., Response in Inter Partes Reexamination of U.S. Pat. No. 7,411,129 (U.S. Appl. No. 95/000,403), Jul. 14, 2010, 32 pages, U.S.
Cerro Wire Inc., Response in Inter Partes Reexamination of U.S. Pat. No. 7,411,129 (U.S. Appl. No. 95/000,403), Sep. 30, 2010, 12 pages, U.S.
Cerro Wire Inc., Response in Inter Partes Reexamination of U.S. Pat. No. 7,411,129 (U.S. Appl. No. 95/000,403), Mar. 2, 2015, 18 pages, U.S.
Cerro Wire Inc., Response in Inter Partes Reexamination of U.S. Pat. No. 7,749,024 (U.S. Appl. No. 95/000,594), May 11, 2011, 69 pages, U.S.
Cerro Wire Inc., Response in Inter Partes Reexamination of U.S. Pat. No. 8,043,119 (U.S. Appl. No. 95/000,695), Jun. 17, 2013, 89 pages, U.S.
Cerro Wire Inc., Response in Inter Partes Reexamination of U.S. Pat. No. 8,043,119 (U.S. Appl. No. 95/000,695), May 14, 2014, 211 pages, U.S.
Cerro Wire Inc., Response in Inter Partes Reexamination of U.S. Pat. No. 8,043,119 (U.S. Appl. No. 95/000,695), Oct. 10, 2014, 7 pages, U.S.
Cerro Wire Inc., Response in Inter Partes Reexamination of U.S. Pat. No. 7,557,301 (U.S. Appl. No. 95/000,696), Jan. 6, 2014, 40 pages, U.S.
Cerro Wire Inc., Response in Inter Partes Reexamination of U.S. Pat. No. 7,557,301 (U.S. Appl. No. 95/000,696), Jan. 24, 2014, 14 pages, U.S.
Cerro Wire Inc., Response to Decision on Appeal in Inter Partes Reexamination of U.S. Pat. No. 7,411,129 (U.S. Appl. No. 95/000,403), Mar. 28, 2014, 61 pages, U.S.
Cerro Wire LLC, Corrected Response Brief for Cross-Appellant in *Southwire Company, LLC v. Cerro Wire LLC*, Appeal from United States Patent and Trademark Office, Patent Trial and Appeal Board in No. 2014-005956 (relating to U.S. Pat. No. 7,749,024 and U.S. Appl. No. 95/000,594), United States Court of Appeals for the Federal Circuit, 2015-1117, -1118, Mar. 2, 2015, 59 pages.
Cerro Wire LLC, Reply Brief for Cross-Appellant in *Southwire Company, LLC v. Cerro Wire LLC*, Appeal from United States Patent and Trademark Office, Patent Trial and Appeal Board in No. 2014-005956 (relating to U.S. Pat. No. 7,749,024 and U.S. Appl. No. 95/000,594), United States Court of Appeals for the Federal Circuit, 2015-1117, -1118, May 7, 2015, 25 pages.
Cerro Wire LLC., Request for Inter Partes Reexamination of U.S. Pat. No. 7,557,301 (U.S. Appl. No. 95/000,696), Sep. 14, 2012, 96 pages, U.S.
Cerro Wire LLC., Request for Oral Hearing for Inter Partes Reexamination of U.S. Pat. No. 7,557,301 (U.S. Appl. No. 95/000,696), Jun. 24, 2015, 10 pages, U.S.
Cerro Wire LLC., Requestor Comments in Opposition to Request for Rehearing in Inter Partes Reexamination of U.S. Pat. No. 7,557,301 (U.S. Appl. No. 95/000,696), Nov. 30, 2015, 10 pages, U.S.
Cerro Wire LLC., Response for Inter Partes Reexamination of U.S. Pat. No. 7,557,301 (U.S. Appl. No. 95/000,696), Mar. 13, 2013, 49 pages, U.S.
Cerro Wire, Inc., Corrected Response Brief for Appellee in *Southwire Company v. Cerro Wire, Inc.*, U.S. Court of Appeals for the Federal Circuit Case No. 2016-2287 (relating to U.S. Pat. No. 7,557,301, U.S. Appl. No. 95/000,696), Dec. 23, 2016, 71 pages.
Cerro Wire, Inc., Exhibit W-11-W-20 (Claim Charts), Request for Inter Partes Reexamination Under 35 U.S.C. M311-318 (Control No. 95/000,594); Nov. 17, 2010; pp. 1-1023 (US).
Cerro Wire, Inc., Exhibit W-1-W-10 (Claim Charts), Request for Inter Partes Reexamination Under 35 U.S.C. M311-318 (Control No. 95/000,594); Nov. 17, 2010; pp. 1-1023 (US).
Cerro Wire, Inc., Exhibit W-21-W-30 (Claim Charts), Request for Inter Partes Reexamination Under 35 U.S.C. M311-318 (Control No. 95/000,594); Nov. 17, 2010; pp. 1-1023 (US).
Cerro Wire, Inc., Exhibit W-31-W-38 (Claim Charts), Request for Inter Partes Reexamination Under 35 U.S.C. M311-318 (Control No. 95/000,594); Nov. 17, 2010; pp. 1-1023 (US).
Cerro Wire, Inc., Requestor Reply to PO Comments to Examiner Determination, for Control No. 95/000,695, filed Jan. 14, 2019, 16 pages.
Crompton Corporation brochure on Amides (approx. 2003) (27pp).
Crompton Corporation, Brochure entitled "Vinyl Additives Product Guide", (2002) (16pp).
Declaration of William N. Unertl, PhD, Reexamination 95/000,573, Exhibit 2, Feb. 25, 2011, 27 pages.
Decoste, J.B., "Friction of Vinyl Chloride Plastics", SPE Journal, Oct. 1969, pp. 67-71, vol. 25.
Domininghaus, H., "Les Matieres plastiques les plus usuelles," Informations Chimie No. 158, 1976, p. 179-195.
Dow Corning article "Siloxane additive minimizes friction in fibre optic cable conduit", 2001 (2pp) (http://www.dowcorning.com).
Dow Corning presentation entitled "MBs to Improve CoF—Injection Moulding & Extrusion"; from filed entitled "DC (multibase) Masterbatch training 2004.ppt"; date uncertain; 8 pages (US).
Dow Corning Product Information sheet re Dow Corning MB25-504 composition, Feb. 1, 2002 (4pp) (http://www.dowcorning.com).
Dow Corning Product Information sheet re Dow Corning MB40-006 composition, Apr. 11, 2005 (4pp) (http://www.dowcorning.com).
Dow Corning Product Information sheet re Dow Corning MB50-001 composition, Jan. 15, 2001 (6pp) (http://www.dowcorning.com).
Dow Corning Product Information sheet re Dow Corning MB50-002 composition, Jun. 2, 2014 (3pp) (http://www.dowcorning.com).
Dow Corning Product Information sheet re Dow Corning MB50-004 composition, Jan. 15, 2001 (4pp) (http://www.dowcorning.com).
Dow Corning Product Information sheet re Dow Corning MB50-008 composition, Apr. 11, 2005 (1 pp) (http://www.dowcorning.com).
Dow Corning Product Information sheet re Dow Corning MB50-010 composition, Jan. 16, 2001 (2pp) (http://www.dowcorning.com).
Dow Corning Product Information sheet re Dow Corning MB50-011 composition, Apr. 11, 2005 (4pp) (http://www.dowcorning.com).
Dow Corning Product Information sheet re Dow Corning MB50-320 composition, Mar. 4, 2008 (1p) (http://www.dowcorning.com).

(56) References Cited

OTHER PUBLICATIONS

Dow Corning Product Information sheet re Dow Corning MB50-321 composition, Jan. 15, 2001 (2pp) (http://www.dowcorning.com).

Dow Corning Product Information sheets re Dow Corning MB50-313 composition, Jan. 15, 2001 (2pp) (http://www.dowcorning.com).

Dow Corning Product Information sheets re Dow Corning MB50-314 composition, Jan. 15, 2001 (2pp) (http://www.dowcorning.com).

Dow Corning, Dow Corning MB50-011 Masterbatch Product Information, Ultra-high molecular weight siloxane polymer dispersed in nylon 6, 1999, 5 pages.

Dow Corning, Dow Corning MB50-011 Masterbatch Product Information, Ultra-high molecular weight siloxane polymer dispersed in polyamide 6, 1997-2001, 4 pages.

Ei Du Pont De Nemours and Company, Flyer entitled "Teflon", (Aug. 14, 2003) (1p) (http://www.dupont.com).

Electronic Petition Request for Terminal Disclaimer, for U.S. Appl. No. 14/858,872, filed Apr. 30, 2019, 3 pages.

Electronic Petition Request for Terminal Disclaimer, for U.S. Appl. No. 15/590,881, filed Apr. 30, 2019, 2 pages.

Electronic Petition Request for Terminal Disclaimer, for U.S. Appl. No. 16/015,688, filed Apr. 30, 2019, 3 pages.

Electronic Petition Request for Terminal Disclaimer, for U.S. Appl. No. 16/015,716, filed Apr. 30, 2019, 3 pages.

*Encore Wire Corporation v. Southwire Company, LLC*, Oral Arguments can be retrieved from <http://oralarguments.cafc.uscourts.gov/default.aspx?fl=2015-1249.mp3>, Appeals from United States Patent and Trademark Office, Patent Trial and Appeal Board in No. 2014-000135 (relating to U.S. Pat. No. 7,749,024 and U.S. Appl. No. 95/000,573), United States Court of Appeals for the Federal Circuit, 2015-1249, -1250, Oct. 7, 2015.

Encore Wire Corporation, Corrected Joint Appendix in *Encore Wire Corporation v. Southwire Company, LLC*, Appeals from United States Patent and Trademark Office, Patent Trial and Appeal Board in No. 2014-000135 (relating to U.S. Pat. No. 7,749,024 and U.S. Appl. No. 95/000,573), United States Court of Appeals for the Federal Circuit, 2015-1249, -1250, Jul. 28, 2015, 427 pages.

Encore Wire Corporation, Notice of Appeal to the U.S. Court of Appeals for the Federal Circuit in Inter Partes Reexamination of U.S. Pat. No. 7,749,024 (U.S. Appl. No. 95/000,573), Nov. 26, 2014, 9 pages, U.S.

Encore Wire Corporation, Opening Brief of Appellant in *Encore Wire Corporation v. Southwire Company, LLC*, Appeals from United States Patent and Trademark Office, Patent Trial and Appeal Board in No. 2014-000135 (relating to U.S. Pat. No. 7,749,024 and U.S. Appl. No. 95/000,573), United States Court of Appeals for the Federal Circuit, 2015-1249, -1250, Mar. 10, 2015, 84 pages.

Encore Wire Corporation, Replacement Request for Ex Parte Reexamination Statements for U.S. Pat. No. 7,557,301 (U.S. Appl. No. 90/009,592), Nov. 17, 2009, 50 pages, U.S.

Encore Wire Corporation, Replacement Request for Inter Partes Reexamination of U.S. Pat. No. 7,749,024 (U.S. Appl. No. 95/000,573), Oct. 8, 2010, 91 pages, U.S.

Encore Wire Corporation, Reply and Response Brief of Appellant/Cross-Appellee in *Encore Wire Corporation v. Southwire Company, LLC*, Appeals from United States Patent and Trademark Office, Patent Trial and Appeal Board in No. 2014-000135 (relating to U.S. Pat. No. 7,749,024 and U.S. Appl. No. 95/000,573), United States Court of Appeals for the Federal Circuit, 2015-1249, -1250, Jun. 11, 2015, 41 pages.

Encore Wire Corporation, Request for Ex Parte Examination of U.S. Pat. No. 7,557,301 (U.S. Appl. No. 90/009,592), Oct. 7, 2009, 161 pages, U.S.

Encore Wire Corporation, Request for Inter Partes Reexamination of U.S. Pat. No. 7,749,024 (U.S. Appl. No. 95/000,573), Sep. 23, 2010, 92 pages, U.S.

Encore Wire Corporation, Request for Rehearing in Inter Partes Reexamination of U.S. Pat. No. 7,749,024 (U.S. Appl. No. 95/000,573), Apr. 22, 2014, 7 pages, U.S.

Encore Wire Corporation, Response Brief in Inter Partes Reexamination of U.S. Pat. No. 7,749,024 (U.S. Appl. No. 95/000,573), Jan. 25, 2013, 53 pages, U.S.

Encore Wire Corporation, Response in Inter Partes Reexamination of U.S. Pat. No. 7,749,024 (U.S. Appl. No. 95/000,573), Mar. 2, 2011, 51 pages, U.S.

Encore Wire, Inc., Exhibits 1-9 (Claim Charts) of Corrected Request for Inter Partes Reexamination Under 35 U.S.C. §§1.193 (Control No. 95/000,573); Oct. 8, 2010; pp. 1-137 (US).

European Patent Office, Extended European Search Report for Application No. 06739714.1, Nov. 12, 2009, 11 pages, The Netherlands.

European Patent Office, Extended European Search Report for Application No. 06770960.0, Aug. 21, 2008, 5 pages, The Netherlands.

European Patent Office, Minutes of Oral Proceeding for Application No. 06770960.0, Jun. 25, 2012, 5 pages, The Netherlands.

European Patent Office, Office Action for Application No. 06739714.1, Aug. 25, 2011, 5 pages, The Netherlands.

European Patent Office, Office Action for Application No. 06739714.1, Feb. 5, 2013, 9 pages, The Netherlands.

European Patent Office, Office Action for Application No. 06739714.1, Jun. 26, 2013, 5 pages, The Netherlands.

European Patent Office, Third Party Observations for Application No. 06739714.1, May 21, 2012, 237 pages, The Netherlands.

European Patent Office, Third Party Observations for Application No. 06770960.0, Apr. 19, 2012, 231 pages, The Netherlands.

Examination Report for New Zealand Application No. 564551, dated Aug. 14, 2009.

General Electric Company, Brochure entitled "GE Silicones-Fluids, Emulsions & Specialties", (2001) (19pp).

Howard & Howard letter to Mr. Thomas C. Wright dated Feb. 7, 2008 regarding U.S. Pat. No. 11/675,441 (2pp) (US).

International Preliminary Examining Authority, International Preliminary Report on Patentability for International Application No. PCT/US2005/005165, Jan. 16, 2007, 6 pages, the International Bureau of WIPO, Switzerland.

International Preliminary Examining Authority, International Preliminary Report on Patentability for International Application No. PCT/US2006/011069, Nov. 30, 2007, 7 pages, the International Bureau of WIPO, Switzerland.

International Preliminary Examining Authority, International Preliminary Report on Patentability for International Application No. PCT/US2006/019923, Nov. 30, 2007, 8 pages, the International Bureau of WIPO, Switzerland.

International Preliminary Examining Authority, International Preliminary Report on Patentability for International Application No. PCT/US2010/027684, Sep. 20, 2011, 8 pages, the International Bureau of WIPO, Switzerland.

International Preliminary Examining Authority, International Preliminary Report on Patentability for International Application No. PCT/US05/05251, Mar. 14, 2006, 4 pages, United States Patent and Trademark Office, U.S.A.

International Preliminary Examining Authority, International Preliminary Report on Patentability for International Application No. PCT/US2006/010929, Nov. 30, 2007, 4 pages, United States Patent and Trademark Office, U.S.A.

International Searching Authority, International Search Report and Written Opinion for International Application No. PCT/US05/05165, Dec. 20, 2005, 8 pages, United States Patent and Trademark Office, U.S.

International Searching Authority, International Search Report and Written Opinion for International Application No. PCT/US06/11069, Aug. 21, 2006, 8 pages, United States Patent and Trademark Office, U.S.

International Searching Authority, International Search Report and Written Opinion for International Application No. PCT/US06/19923, Oct. 20, 2006, 9 pages, United States Patent and Trademark Office, U.S.

(56) References Cited

OTHER PUBLICATIONS

International Searching Authority, International Search Report and Written Opinion for International Application No. PCT/US10/27684, May 17, 2010, 8 pages, United States Patent and Trademark Office, U.S.

International Searching Authority, International Search Report and Written Opinion for International Application No. PCT/US05/05251, Jul. 5, 2005, 4 pages, United States Patent and Trademark Office, U.S.A.

International Searching Authority, International Search Report and Written Opinion for International Application No. PCT/US06/11070, Dec. 27, 2006, 7 pages, United States Patent and Trademark Office, U.S.A.

International Searching Authority, International Search Report and Written Opinion for International Application No. PCT/US06/10929, Aug. 1, 2006, 4 pages, United States Patent and Trademark Office, U.S.A.

Kaufman, S., et al., "A PVC jacket compound with improved flame retardancy and superior physical properties", Wire Technology, pp. 44-50, 7/8:75, (paper presented at the 23rd international Wire & Cable Symposium in Atlantic City, Dec. 1974).

Marquis, et al., "An Introduction to Fatty Acid Amide Slip and Anti-Block Agents", Polymers, Laminations & Coatings Conference in San Francisco, CA. from Aug. 30 to Sep. 3, 1998, pp. 941-952, Tappi Press.

Office Action for Co-Pending Japanese Patent Application No. 2008-513468, mailed Dec. 20, 2011, 5 pages. (Translation only).

Office Action for Co-Pending Japanese Patent Application No. 2013-150174, mailed Jul. 22, 2014, 11 pages.

Office Action for Co-Pending Patent Application No. 88656 in Panama mailed Oct. 6, 2011, 2 pgs.

Opposition to European Patent EP 1899988 and accompanying documentation, filed with EPO on Oct. 22, 2013, received Oct. 29, 2013, 23 pages.

Polywater® J specification, Lubrifiant Haute Performance, American Polywater Corporation, Aug. 2010, 4 pages.

Ryan, K. J., et al., "Ultra-High-Molecular-Weight Functional Siloxane Additives in Polymers. Effects on Processing and Properties," Vinyl & Additive Technology, Mar. 2000, vol. 6, No., 13 pages.

Southwire Company and Cerro Wire LLC, (Joint) Stipulated Motion to Voluntarily Dismiss Appeal in *Southwire Company* v. *Cerro Wire LLC*, U.S. Court of Appeals for the Federal Circuit No. 2016-2643 (relating to U.S. Pat. No. 7,411,129, U.S. Appl. No. 95/000,403), Jan. 26, 2017, 7 pages.

Southwire Company and Cerro Wire, Inc., Joint Appendix in *Southwire Company* v. *Cerro Wire, Inc.*, U.S. Court of Appeals for the Federal Circuit Case No. 2016-2287 (relating to U.S. Pat. No. 7,557,301, U.S. Appl. No. 95/000,696), Feb. 17, 2017, 323 pages.

*Southwire Company* v. *Cerro Wire Inc.*, Answer to Complaint for Patent Infringement and Demand for Jury Trial, Civil Action No. 3:08-cv-92-JTC, U.S.D.C., Northern District of Georgia, Newnan Division, Oct. 16, 2008, 8 pages, U.S.

*Southwire Company* v. *Cerro Wire Inc.*, Defendant Cerro Wire Inc.'s Motion to Stay Pending Reexmination of the Patent-In-Suit, Civil Action No. 3:08-cv-92-JTC, U.S.D.C., Northern District of Georgia, Newnan Division, Dec. 12, 2008, 11 pages, U.S.

*Southwire Company* v. *Cerro Wire Inc.*, Defendant Cerro Wire, Inc.'s Response To Plaintiff's Motion To Dismiss Cerro's Invalidity Defenses Under 35 U.S.C. §§ 102 and 103, Civil Action No. 3:08-cv-92-JTC, U.S.D.C., Northern District of Georgia, Newnan Division, Jan. 16, 2009, 7 pages, U.S.

*Southwire Company* v. *Cerro Wire Inc.*, Defendant Cerro Wire's Reply Memorandum in Support of Its Motion to Stay Pending Reexmination of the Patent-In-Suit, Civil Action No. 3:08-cv-92-JTC, U.S.D.C., Northern District of Georgia, Newnan Division, Jan. 16, 2009, 17 pages, U.S.

*Southwire Company* v. *Cerro Wire Inc.*, Motion To Dismiss Cerro Wire Inc.'s Defenses Of Invalidity Under 35 U.S.C. §§ 102 and 103, Civil Action No. 3:08-cv-92-JTC, U.S.D.C., Northern District of Georgia, Newnan Division, Jan. 2, 2009, 19 pages, U.S.

*Southwire Company* v. *Cerro Wire Inc.*, Order to Stay Pending Reexamination Of The Patent In Suit, Civil Action No. 3:08-cv-92-JTC, U.S.D.C., Northern District of Georgia, Newnan Division, May 12, 2009, 13 pages, U.S.

*Southwire Company* v. *Cerro Wire Inc.*, Southwire Company's Reply In Support Of Its Motion To Dismiss Cerro Wire Inc.'s Defenses Of Invalidity Under 35 U.S.C. §§ 102 and 103 and Further Opposition To Cerro Wire Inc.'s Motion For Stay Pending Reexamination Of The Patent In Suit, Civil Action No. 3:08-cv-92-JTC, U.S.D.C., Northern District of Georgia, Newnan Division, Jan. 26, 2009, 16 pages, U.S.

*Southwire Company* v. *Cerro Wire Inc.*, Southwire's Opposition To Defendant's Motion For Stay Pending Reexamination Of The Patent-In-Suit, Civil Action No. 3:08-cv-92-JTC, U.S.D.C., Northern District of Georgia, Newnan Division, Jan. 2, 2009, 79 pages, U.S.

*Southwire Company* v. *Cerro Wire, Inc.*, Complaint for Patent Infringement and Demand for Jury Trial (with Exhibit A), Civil Action No. 3:08-cv-92-JTC, U.S.D.C., Northern District of Georgia, Newnan Division, Aug. 12, 2008, 16 pages, U.S.

*Southwire Company* v. *Encore Wire Corporation and Cerro Wire Inc.*, Plaintiff's Answer To Encore Wire Corporation's First Amended Answer, Affirmative Defenses, And Counterclaims, Civil Action No. 6:09-cv-289-LED, U.S.D.C., Eastern District of Texas, Tyler Division, Feb. 12, 2010, 17 pages, U.S.

*Southwire Company* v. *Encore Wire Corporation and Cerro Wire Inc.*, Plaintiff's Opening Claim Construction Brief, Civil Action No. 6:09-cv-289-LED, U.S.D.C., Eastern District of Texas, Tyler Division, Sep. 7, 2010, 103 pages, U.S.

*Southwire Company* v. *Encore Wire Corporation and Cerro Wire Inc.*, Joint Claim Construction Chart, Civil Action No. 6:09-cv-289-LED, U.S.D.C., Eastern District of Texas, Tyler Division, Oct. 7, 2010, 11 pages, U.S.

*Southwire Company* v. *Encore Wire Corporation and Cerro Wire Inc.*, Plaintiff's Claim Construction Reply Brief, Civil Action No. 6:09-cv-289-LED, U.S.D.C., Eastern District of Texas, Tyler Division, Oct. 7, 2010, 67 pages, U.S.

Southwire Company, Amended Response in Inter Partes Reexamination of U.S. Pat. No. 7,411,129 (U.S. Appl. No. 95/000,403), Apr. 30, 2010, 19 pages, U.S.

Southwire Company, Appeal Brief in Inter Partes Reexamination of U.S. Pat. No. 7,749,024 (U.S. Appl. No. 95/000,573), Dec. 31, 2012, 67 pages, U.S.

Southwire Company, Appeal Brief in Inter Partes Reexamination of U.S. Pat. No. 7,749,024 (U.S. Appl. No. 95/000,594), Jan. 28, 2013, 120 pages, U.S.

Southwire Company, Appeal Brief in Inter Partes Reexamination of U.S. Pat. No. 7,749,024 (U.S. Appl. No. 95/000,594), Aug. 5, 2013, 63 pages, U.S.

Southwire Company, Appeal Brief in Inter Partes Reexamination of U.S. Pat. No. 8,043,119 (U.S. Appl. No. 95/000,695), Dec. 10, 2014, 34 pages, U.S.

Southwire Company, Appeal Brief in Inter Partes Reexamination of U.S. Pat. No. 7,557,301 (U.S. Appl. No. 95/000,696), May 21, 2014, 134 pages, U.S.

Southwire Company, Appellant's Rebuttal in Inter Partes Reexamination of U.S. Pat. No. 7,749,024 (U.S. Appl. No. 95/000,573), Aug. 16, 2013, 14 pages, U.S.

Southwire Company, Appellant's Request for Rehearing Following a Decision on Appeal in Inter Partes Reexamination of U.S. Pat. No. 7,557,301 (U.S. Appl. No. 95/000,696), Oct. 29, 2015, 20 pages, U.S.

Southwire Company, Applicant's Request for Further Processing of European Application No. 06739714.1, Mar. 7, 2011, 16 pages, Germany.

Southwire Company, Applicant's Response in European Application No. 06739714.1, Jun. 25, 2012, 27 pages, Germany.

Southwire Company, Applicant's Response in European Application No. 06739714.1, Jun. 14, 2013, 15 pages, Germany.

Southwire Company, Applicant's Response in European Application No. 06770960.0, Sep. 29, 2009, 9 pages, Germany.

Southwire Company, Applicant's Response in European Application No. 06739714.1, Feb. 13, 2014, 12 pages, Germany.

(56) References Cited

OTHER PUBLICATIONS

Southwire Company, Confirmation of Hearing by Appellant in Inter Partes Reexamination of U.S. Pat. No. 7,557,301 (U.S. Appl. No. 95/000,696), Jun. 29, 2015, 5 pages, U.S.

Southwire Company, Corrected Appeal Brief in Inter Partes Reexamination of U.S. Pat. No. 7,557,301 (U.S. Appl. No. 95/000,696), Jun. 30, 2014, 133 pages, U.S.

Southwire Company, Corrected Response in Ex Parte Examination of U.S. Pat. No. 7,557,301 (U.S. Appl. No. 90/009,589), Jun. 7, 2010, 12 pages, U.S.

Southwire Company, Corrected Response in Inter Partes Reexamination of U.S. Pat. No. 7,749,024 (U.S. Appl. No. 95/000,594), Apr. 26, 2011, 85 pages, U.S.

Southwire Company, Cross-Respondent Patent Owner's Brief in Inter Partes Reexamination of U.S. Pat. No. 7,411,129 (U.S. Appl. Nos. 95/000,403), Sep. 13, 2010, 23 pages, U.S.

*Southwire Company, LLC v. Cerro Wire LLC*, Oral Arguments can be retrieved from <http://oralarguments.cafc.uscourts.gov/default.aspx?fl=2015-1117.mp3>, Appeals from United States Patent and Trademark Office, Patent Trial and Appeal Board in No. 2014-005956 (relating to U.S. Pat. No. 7,749,024 and U.S. Appl. No. 95/000,594), United States Court of Appeals for the Federal Circuit, 2015-1117, -1118, Oct. 7, 2015.

Southwire Company, LLC, Joint Appendix in *Southwire Company, LLC v. Cerro Wire LLC*, Appeal from United States Patent and Trademark Office, Patent Trial and Appeal Board in No. 2014-005956 (relating to U.S. Pat. No. 7,749,024 and U.S. Appl. No. 95/000,594), United States Court of Appeals for the Federal Circuit, 2015-1117, -1118, May 18, 2015, 289 pages.

Southwire Company, LLC, Notice of Appeal to the U.S. Court of Appeals for the Federal Circuit in Inter Partes Reexamination of U.S. Pat. No. 7,411,129 B2 (U.S. Appl. No. 95/000,403), Sep. 13, 2016, 3 pages, U.S.

Southwire Company, LLC, Principal and Response Brief of Cross-Appellant in *Encore Wire Corporation v. Southwire Company, LLC*, Appeal from United States Patent and Trademark Office, Patent Trial and Appeal Board in No. 2014-000135 (relating to U.S. Pat. No. 7,749,024 and U.S. Appl. No. 95/000,573), United States Court of Appeals for the Federal Circuit, 2015-1249, -1250, Apr. 23, 2015, 70 pages.

Southwire Company, LLC, Reply Brief of Cross-Appellant in *Encore Wire Corporation v. Southwire Company, LLC*, Appeal from United States Patent and Trademark Office, Patent Trial and Appeal Board in No. 2014-000135 (relating to U.S. Pat. No. 7,749,024 and U.S. Appl. No. 95/000,573), United States Court of Appeals for the Federal Circuit, 2015-1249, -1250, Jun. 25, 2015, 25 pages.

Southwire Company, LLC, Response and Reply Brief of Appellant in *Southwire, LLC v. Cerro Wire LLC*, Appeal from United States Patent and Trademark Office, Patent Trial and Appeal Board in No. 2014-005956 (relating to U.S. Pat. No. 7,749,024 and U.S. Appl. No. 95/000,594), United States Court of Appeals for the Federal Circuit, 2015-1117, -1118, Apr. 21, 2015, 60 pages.

Southwire Company, Llc, Response to Decision on Appeal in Inter Partes Reexamination of U.S. Pat. No. 8,043,119 (U.S. Appl. No. 95/000,695), Feb. 16, 2018, 286 pages, U.S.A.

Southwire Company, Notice of Appeal in Inter Partes Reexamination of U.S. Pat. No. 7,557,301 (U.S. Appl. No. 95/000,696), Mar. 21, 2014, 10 page, U.S.

Southwire Company, Notice of Appeal in Inter Partes Reexamination of U.S. Pat. No. 7,749,024 (U.S. Appl. No. 95/000,594), Nov. 26, 2012, 5 pages, U.S.

Southwire Company, Notice of Appeal to U.S. Court of Appeals for the Federal Circuit in Inter Partes Reexamination of U.S. Pat. No. 7,749,024 (U.S. Appl. No. 95/000,594), Sep. 19, 2014, 6 pages, U.S.

Southwire Company, Notice of Election to Participate and Notice of Cross-Appeal to the U.S. Court of Appeals for the Federal Circuit in Inter Partes Reexamination of U.S. Pat. No. 7,749,024 (U.S. Appl. No. 95/000,573), Jan. 2, 2015, 14 pages, U.S.

Southwire Company, Opening Brief in Southwire Company v. Cerro Wire, Inc., U.S. Court of Appeals for the Federal Circuit Case No. 2016-2287 (relating to U.S. Pat. No. 7,557,301, U.S. Appl. No. 95/000,696), Oct. 14, 2016, 131 pages.

Southwire Company, Opening Brief of Appellant in *Southwire Company v. Cerro Wire, Inc.*, Appeal from United States Patent and Trademark Office, Patent Trial and Appeal Board in No. 2014-005956, United States Court of Appeals for the Federal Circuit, 15-1117, -1118, Dec. 29, 2014, 63 pages, U.S.

Southwire Company, Patent Owner Comments on Request for Rehearing and Petition Under 37 C.F.R. § 41.3 to Strike Requester's Improper Paper in Inter Partes Reexamination of U.S. Pat. No. 8,043,119 (U.S. Appl. No. 95/000,695), Mar. 16, 2018, 53 pages, U.S.A.

Southwire Company, Patent Owner's Agenda for Interview with the Examiner for Ex Parte Reexamination of U.S. Pat. No. 8,382,518 (U.S. Appl. No. 96/000,144), Apr. 28, 2017, 9 pages, U.S.A.

Southwire Company, Patent Owner's Appeal Brief in Inter Partes Reexamination of U.S. Pat. No. 7,411,129 (U.S. Appl. No. 95/000,403), Sep. 13, 2010, 30 pages, U.S.

Southwire Company, Patent Owner's Comments in Response to Examiner's Determination after Board Decision for Control No. 95/000,695, filed Dec. 14, 2018, 26 pages, USA.

Southwire Company, Patent Owner's Reply to Requestor's Comments In Response to Examiners' Determination, for Control No. 95/000,695, filed Jan. 15, 2019, 20 pages.

Southwire Company, Patent Owner's Response to Non-Final Office Action, including Written Statement of May 3, 2017 Interview in Ex Parte Reexamination of U.S. Pat. No. 8,382,518 (U.S. Appl. No. 96/000,144), May 22, 2017, 343 pages, U.S.A.

Southwire Company, Patent Owner's Response to Office Action for U.S. Appl. No. 14/858,872, filed Mar. 17, 2017, 11 pages, U.S.A.

Southwire Company, Patent Owner's Response to Request for Rehearing in Inter Partes Reexamination of U.S. Pat. No. 7,749,024 (U.S. Appl. No. 95/000,573), May 22, 2014, 5 pages, U.S.

Southwire Company, Patent Owner's Response, including Terminal Disclaimer and Information Disclosure Statement, to Final Office Action in Ex Parte Reexamination of U.S. Pat. No. 8,382,518 (U.S. Appl. No. 96/000,144), Sep. 14, 2017, 33 pages, U.S.A.

Southwire Company, Patent Owner's Written Statement of an Interview with the Examiner for Ex Parte Reexamination of U.S. Pat. No. 8,382,518 (U.S. Appl. No. 96/000,144), Dec. 2, 2016, 12 pages, U.S.

Southwire Company, Petition in Inter Partes Reexamination of U.S. Pat. No. 7,749,024 (U.S. Appl. No. 95/000,594), Jan. 28, 2013, 14 pages, U.S.

Southwire Company, Rebuttal Brief in Inter Partes Reexamination of U.S. Pat. No. 7,749,024 (U.S. Appl. No. 95/000,594), Jan. 6, 2014, 16 pages, U.S.

Southwire Company, Rebuttal Brief in Inter Partes Reexamination of U.S. Pat. No. 8,043,119 (U.S. Appl. No. 95/000,695), Mar. 4, 2015, 6 pages, U.S.

Southwire Company, Reply Brief of the Appellant in *Southwire Company v. Cerro Wire, Inc.*, U.S. Court of Appeals for the Federal Circuit Case No. 2016-2287 (relating to U.S. Pat. No. 7,557,301, U.S. Appl. No. 95/000,696), Feb. 10, 2017, 37 pages.

Southwire Company, Reply in U.S. Appl. No. 12/017,222, filed Dec. 8, 2008, 17 pages, U.S.

Southwire Company, Reply in for U.S. Appl. No. 12/017,222, filed Dec. 12, 2008, 12 pages, U.S.

Southwire Company, Reply to Notice of Allowance for U.S. Appl. No. 13/274,052, filed Nov. 19, 2012, 23 pages, U.S.

Southwire Company, Reply to Notice of Allowance for U.S. Appl. No. 13/274,052, filed Dec. 19, 2012, 5 pages, U.S.

Southwire Company, Reply to Notice of Allowance for U.S. Appl. No. 13/774,677, filed Jul. 29, 2013, 24 pages, U.S.

Southwire Company, Reply to Notice of Allowance for U.S. Appl. No. 14/144,150, filed Feb. 17, 2015, 11 pages, U.S.

Southwire Company, Reply to Notice of Opposition in European Application No. 06770960.0, Jun. 9, 2014, 109 pages, Germany.

Southwire Company, Request for Oral Hearing in Inter Partes Reexamination of U.S. Pat. No. 7,557,301 (U.S. Appl. No. 95/000,696), Oct. 28, 2014, 5 pages, U.S.

(56) References Cited

OTHER PUBLICATIONS

Southwire Company, Respondent Brief in Inter Partes Reexamination of U.S. Pat. No. 8,043,119 (U.S. Appl. No. 95/000,695), Jan. 9, 2015, 25 pages, U.S.
Southwire Company, Response (Petition to Reopen and Request to Proposed Amendment) in Inter Partes Reexamination of U.S. Pat. No. 7,749,024 (U.S. Appl. No. 95/000,573), Oct. 17, 2012, 66 pages, U.S.
Southwire Company, Response in Ex Parte Examination of U.S. Pat. No. 7,557,301 (U.S. Appl. No. 90/009,589), Jun. 4, 2010, 79 pages, U.S.
Southwire Company, Response in Ex Parte Reexamination of U.S. Pat. No. 7,557,301 (U.S. Appl. No. 90/009,592), Jul. 8, 2010, 6 pages, U.S.
Southwire Company, Response in Ex Parte Reexamination of U.S. Pat. No. 7,557,301 (U.S. Appl. No. 90/009,592), Oct. 25, 2010, 76 pages, U.S.
Southwire Company, Response in Ex Parte Reexamination of U.S. Pat. No. 7,557,301 (U.S. Appl. No. 90/009,589 and U.S. Appl. No. 90/009,592), Dec. 16, 2010, 10 pages, U.S.
Southwire Company, Response in Ex Parte Reexamination of U.S. Pat. No. 7,557,301 (U.S. Appl. No. 90/009,589 and U.S. Appl. No. 90/009,592), Aug. 10, 2011, 21 pages, U.S.
Southwire Company, Response in Inter Partes Reexamination of U.S. Pat. No. 7,411,129 (U.S. Appl. No. 95/000,403), Feb. 5, 2009, 104 pages, U.S.
Southwire Company, Response in Inter Partes Reexamination of U.S. Pat. No. 7,411,129 (U.S. Appl. No. 95/000,403), Sep. 1, 2009, 27 pages, U.S.
Southwire Company, Response in Inter Partes Reexamination of U.S. Pat. No. 7,411,129 (U.S. Appl. No. 95/000,403), Apr. 29, 2010, 39 pages, U.S.
Southwire Company, Response in Inter Partes Reexamination of U.S. Pat. No. 7,411,129 (U.S. Appl. No. 95/000,403), Jun. 30, 2010, 5 pages, U.S.
Southwire Company, Response in Inter Partes Reexamination of U.S. Pat. No. 7,411,129 (U.S. Appl. No. 95/000,403), Jul. 31, 2010, 8 pages, U.S.
Southwire Company, Response in Inter Partes Reexamination of U.S. Pat. No. 7,411,129 (U.S. Appl. No. 95/000,403), Sep. 9, 2010, 8 pages, U.S.
Southwire Company, Response in Inter Partes Reexamination of U.S. Pat. No. 7,411,129 (U.S. Appl. No. 95/000,403), Jan. 30, 2015, 22 pages, U.S.
Southwire Company, Response in Inter Partes Reexamination of U.S. Pat. No. 7,749,024 (U.S. Appl. No. 95/000,573), Feb. 3, 2011, 50 pages, U.S.
Southwire Company, Response in Inter Partes Reexamination of U.S. Pat. No. 7,749,024 (U.S. Appl. No. 95/000,594), Apr. 11, 2011, 78 pages, U.S.
Southwire Company, Response in Inter Partes Reexamination of U.S. Pat. No. 8,043,119 (U.S. Appl. No. 95/000,695), May 16, 2013, 163 pages, U.S.
Southwire Company, Response in Inter Partes Reexamination of U.S. Pat. No. 8,043,119 (U.S. Appl. No. 95/000,695), Apr. 14, 2014, 37 pages, U.S.
Southwire Company, Response in Inter Partes Reexamination of U.S. Pat. No. 8,043,119 (U.S. Appl. No. 95/000,695), Sep. 29, 2014, 7 pages, U.S.
Southwire Company, Response in Inter Partes Reexamination of U.S. Pat. No. 7,557,301 (U.S. Appl. No. 95/000,696), Feb. 11, 2013, 146 pages, U.S.
Southwire Company, Response in Inter Partes Reexamination of U.S. Pat. No. 7,557,301 (U.S. Appl. No. 95/000,696), Dec. 6, 2013, 19 pages, U.S.
Southwire Company, Response to Action Closing Prosecution in Inter Partes Reexamination of U.S. Pat. No. 7,749,024 (U.S. Appl. No. 95/000,594), Sep. 10, 2012, 67 pages, U.S.
Southwire Company, Response to Decision on Appeal in Inter Partes Reexamination of U.S. Pat. No. 7,411,129 (U.S. Appl. No. 95/000,403), Feb. 28, 2014, 151 pages, U.S.
Southwire Company, Response to Jun. 14, 2018 Non-Final Office Action, including Affidavits, for U.S. Appl. No. 14/858,872, filed Nov. 14, 2018, 41 pages, USA.
Southwire Company, Response to Non-final Office Action for Ex Parte Reexamination of U.S. Pat. No. 8,382,518 (U.S. Appl. No. 96/000,144), Nov. 8, 2016, 104 pages, U.S.
Southwire Company, Response to Notice of Allowance for U.S. Appl. No. 12/497,586, filed Nov. 8, 2012, 9 pages, U.S.
Southwire Company, Response to Notice to File Corrected Papers for U.S. Appl. No. 12/497,586, filed Nov. 16, 2012, 12 pages, U.S.
Southwire Company, Response to Nov. 2, 2017 Non-Final Office Action and Terminal Disclaimer for U.S. Appl. No. 15/590,881, filed May 2, 2018, 44 pages, U.S.A.
Southwire Company, Response to Office Action for U.S. Appl. No. 10/952,294, filed Dec. 12, 2006, 14 pages, U.S.
Southwire Company, Response to Office Action for U.S. Appl. No. 10/952,294, filed May 14, 2007, 20 pages, U.S.
Southwire Company, Response to Office Action for U.S. Appl. No. 10/952,294, filed Jul. 11, 2007, 27 pages, U.S.
Southwire Company, Response to Office Action for U.S. Appl. No. 10/952,294, filed Aug. 9, 2007, 19 pages, U.S.
Southwire Company, Response to Office Action for U.S. Appl. No. 10/952,294, filed Sep. 14, 2007, 7 pages, U.S.
Southwire Company, Response to Office Action for U.S. Appl. No. 10/952,294, filed Feb. 15, 2008, 9 pages, U.S.
Southwire Company, Response to Office Action for U.S. Appl. No. 11/120,487, filed Dec. 9, 2005, 8 pages, U.S.
Southwire Company, Response to Office Action for U.S. Appl. No. 11/120,487, filed Apr. 28, 2006, 16 pages, U.S.
Southwire Company, Response to Office Action for U.S. Appl. No. 11/135,807, filed Apr. 27, 2006, 14 pages, U.S.
Southwire Company, Response to Office Action for U.S. Appl. No. 11/135,986, filed Jan. 12, 2007, 14 pages, U.S.
Southwire Company, Response to Office Action for U.S. Appl. No. 11/675,441, filed Jun. 30, 2008, 47 pages, U.S.
Southwire Company, Response to Office Action for U.S. Appl. No. 11/675,441, filed Apr. 6, 2009, 15 pages, U.S.
Southwire Company, Response to Office Action for U.S. Appl. No. 11/675,441, filed Sep. 4, 2009, 12 pages, U.S.
Southwire Company, Response to Office Action for U.S. Appl. No. 11/675,441, filed Mar. 24, 2010, 18 pages, U.S.
Southwire Company, Response to Office Action for U.S. Appl. No. 11/858,766, filed Dec. 9, 2008, 13 pages, U.S.
Southwire Company, Response to Office Action for U.S. Appl. No. 12/017,222, filed Oct. 21, 2008, 26 pages, U.S.
Southwire Company, Response to Office Action for U.S. Appl. No. 12/497,586, filed Jan. 9, 2012, 21 pages, U.S.
Southwire Company, Response to Office Action for U.S. Appl. No. 12/497,586, filed May 30, 2012, 15 pages, U.S.
Southwire Company, Response to Office Action for U.S. Appl. No. 12/787,877, filed Apr. 28, 2011, 44 pages, U.S.
Southwire Company, Response to Office Action for U.S. Appl. No. 13/274,052, filed May 23, 2012, 14 pages, U.S.
Southwire Company, Response to Request for Inter Partes Reexamination of U.S. Pat. No. 7,411,129 (U.S. Appl. No. 95/000,403), Oct. 21, 2008, 28 pages, U.S.
Southwire Company, Response to Respondent's Appeal Brief in Inter Partes Reexamination of U.S. Pat. No. 7,557,301 (U.S. Appl. No. 95/000,696), Jul. 3, 2014, 10 pages, U.S.
Southwire Company, Response to Respondent's Rebuttal Brief in Inter Partes Reexamination of U.S. Pat. No. 7,557,301 (U.S. Appl. No. 95/000,696), Sep. 29, 2014, 6 pages, U.S.
Southwire Company, Supplemental Response in Ex Parte Examination of U.S. Pat. No. 7,557,301 (U.S. Appl. No. 90/009,589), Jun. 11, 2010, 13 pages, U.S.
Southwire Company, Supplemental Response in Ex Parte Examination of U.S. Pat. No. 7,557,301 (U.S. Appl. No. 90/009,589), Sep. 22, 2010, 47 pages, U.S.
Southwire Company, Supplemental Response to Office Action for U.S. Appl. No. 13/274,052, filed Jul. 16, 2012, 37 pages, U.S.

(56) References Cited

OTHER PUBLICATIONS

Southwire Company, Unopposed Motion for Extension of Time to File Appellant's Opening Brief in *Southwire Company v. Cerro Wire LLC*, U.S. Court of Appeals for the Federal Circuit No. 2016-2643 (relating to U.S. Pat. No. 7,411,129, U.S. Appl. No. 95/000,403), Dec. 7, 2016, 8 pages.
Southwire, "Romex® SIMpull® Type NM-B", Product Specifications, retrieved from <http://www.southwire.com/products/RomexSIMpullTypeNMBOEM.htm> on Mar. 12, 2015.
Thermoplastic-Insulated Wires and Cables, UL 83, In CSA Standards Update Service, Thirteenth Edition, Nov. 15, 2003, 186 pages.
Translation of Submission of Oct. 22, 2013 from IPSILON to the EPO; Re: Opposition to European Patent EP 1899988, 21 pages.
Trotignon, J. P., et al., "Extrusion des Thermoplastiques, In Matieres Plastiques," Editons Nathan, 1996, p. 148.
U.S. Appl. No. 60/544,224, filed Feb. 12, 2004, Carlson et al., 6 pp.
U.S. Court of Appeals for the Federal Circuit, Opinion (PTAB Affirmed) in *Southwire Company v. Cerro Wire, Inc.*, U.S. Court of Appeals for the Federal Circuit Case No. 2016-2287 (relating to U.S. Pat. No. 7,557,301, U.S. Appl. No. 95/000,696), Sep. 8, 2017, 11 pages.
U.S. Appl. No. 16/015,688, Amendment, Feb. 5, 2019, 37 pages.
U.S. Appl. No. 16/015,716, Amendment, Feb. 19, 2019, 39 pages.
UL Standard for Safety for Nonmetallic-Sheathed Cables, UL 719, Twelfth Edition, Feb. 9, 2006.
Ultra-X TM, Une nouvelle dimension dans les cables NMD-7, ultra-X product brochure, Northern Telecom—Power Cable Division, Apr. 11, 1977, 28 pages.
Underwriters Laboratories Inc. Standard for Safety UL-719 for Nonmetallic-Sheathed Cables, Eleventh Edition, Mar. 21, 2002, 46 pages.
United States Court of Appeals for the Federal Circuit, Order (Dismissing Proceeding) in *Southwire Company v. Cerro Wire LLC*, U.S. Court of Appeals for the Federal Circuit No. 2016-2643 (relating to U.S. Pat. No. 7,411,129, U.S. Appl. No. 95/000,403), Jan. 27, 2017, 2 pages.
United States Court of Appeals for the Federal Circuit, Order On Petition for Panel Rehearing and Rehearing En Banc—Denied—in *Southwire Company v. Cerro Wire, LLC*, U.S. Court of Appeals for the Federal Circuit Case No. 2016-2287, Dec. 5, 2017, 2 pages.
United States Court of Appeals, *Encore Wire Corporation v. Southwire Company, LLC*, Order (Dismissed), Appeals from United States Patent and Trademark Office, Patent Trial and Appeal Board in No. 2014-000135 (relating to U.S. Pat. No. 7,749,024 and U.S. Appl. No. 95/000,573), United States Court of Appeals for the Federal Circuit, 2015-1249, -1250, Oct. 20, 2015, 2 pages.
United States Court of Appeals, *Southwire Company, LLC v. Cerro Wire, LLC*, Judgment (Affirmed), Appeals from United States Patent and Trademark Office, Patent Trial and Appeal Board in No. 2014-005956 (relating to U.S. Pat. No. 7,749,024 and U.S. Appl. No. 95/000,594), United States Court of Appeals for the Federal Circuit, 2015-1117, -1118, Oct. 20, 2015, 2 pages.
United States Patent and Trademark Office, Action Closing Prosecution in Inter Partes Reexamination of U.S. Pat. No. 7,749,024 (U.S. Appl. No. 95/000,573), Jul. 9, 2012, 59 pages, U.S.
United States Patent and Trademark Office, Board Decision, Examiner Affirmed in Part in Inter Partes Reexamination of U.S. Pat. No. 7,749,024 (U.S. Appl. No. 95/000,573), Mar. 28, 2014, 20 pages, U.S.
United States Patent and Trademark Office, Board Decision, Reconsideration Denied in Part in Inter Partes Reexamination of U.S. Pat. No. 7,749,024 (U.S. Appl. No. 95/000,573), Nov. 3, 2014, 5 pages, U.S.
United States Patent and Trademark Office, Examiner's Answer in Inter Partes Reexamination of U.S. Pat. No. 7,749,024 (U.S. Appl. No. 95/000,573), Jul. 16, 2013, 3 pages, U.S.
United States Patent and Trademark Office, Office Action in Inter Partes Reexamination of U.S. Pat. No. 7,749,024 (U.S. Appl. No. 95/000,573), Dec. 3, 2010, 12 pages, U.S.
United States Patent and Trademark Office, Office Communication in Inter Partes Reexamination of U.S. Pat. No. 7,749,024 (U.S. Appl. No. 95/000,573), Sep. 4, 2013, 3 pages, U.S.
United States Patent and Trademark Office, Order Granting Inter Partes Reexamination of U.S. Pat. No. 7,749,024 (U.S. Appl. No. 95/000,573), Nov. 9, 2010, 22 pages, U.S.
United States Patent and Trademark Office, Petition Decisions in Inter Partes Reexamination of U.S. Pat. No. 7,749,024 (U.S. Appl. No. 95/000,573), Apr. 4, 2013, Jun. 19, 2013, and Jun. 21, 2013, 25 pages, U.S.
United States Patent and Trademark Office, Right of Appeal Notice in Inter Partes Reexamination of U.S. Pat. No. 7,749,024 (U.S. Appl. No. 95/000,573), Sep. 28, 2012, 58 pages, U.S.
United States Patent and Trademark Office, Action Closing Prosecution in Inter Partes Reexamination of U.S. Pat. No. 7,749,024 (U.S. Appl. No. 95/000,594), Aug. 10, 2012, 166 pages, U.S.
United States Patent and Trademark Office, Action Closing Prosecution for Inter Partes Reexamination of U.S. Pat. No. 8,043,119 (U.S. Appl. No. 95/000,695), Jul. 2, 2014, 104 pages, U.S.
United States Patent and Trademark Office, Applicant Initiated Interview Summary, for U.S. Appl. No. 16/015,688, filed Apr. 30, 2019, 3 pages, USA.
United States Patent and Trademark Office, Applicant Initiated Interview Summary, for U.S. Appl. No. 16/015,716, filed Apr. 30, 2019, 3 pages, USA.
United States Patent and Trademark Office, Applicant Initiated Interview Summary for U.S. Appl. No. 14/858,872, filed Oct. 2, 2018, 5 pages, U.S.A.
United States Patent and Trademark Office, Closing Action for Inter Partes Reexamination of U.S. Pat. No. 7,411,129 and Office Action (U.S. Appl. No. 95/000,403), Jul. 1, 2009, 41 pages, U.S.
United States Patent and Trademark Office, Closing Action in Inter Partes Reexamination of U.S. Pat. No. 7,557,301 (U.S. Appl. No. 95/000,696), Nov. 6, 2013, 81 pages, U.S.
United States Patent and Trademark Office, Confirmation of Hearing by Appellant for U.S. Appl. No. 14/620,963, filed Mar. 19, 2019, 4 pages, USA.
United States Patent and Trademark Office, Decision On Appeal—Examiner Reversed for U.S. Appl. No. 14/620,963, filed May 6, 2019, 9 pages, USA.
United States Patent and Trademark Office, Decision on Examiner's Determination (Affirmed) in Inter Partes Reexamination of U.S. Pat. No. 7,411,129 B2 (U.S. Appl. No. 95/000,403), Jul. 13, 2016, 20 pages, U.S.
United States Patent and Trademark Office, Decision on Petition, Denying Patent Owner's Petition to Strike Requester's Improper Paper, Inter Partes Reexamination of U.S. Pat. No. 8,043,119 (U.S. Appl. No. 95/000,695), May 10, 2018, 10 pages, U.S.
United States Patent and Trademark Office, Decision to Merge Proceedings in Ex Parte Reexamination of U.S. Pat. No. 7,557,301 (U.S. Appl. No. 90/009,589 and U.S. Appl. No. 90/009,592), Nov. 23, 2010, 10 pages, U.S.
United States Patent and Trademark Office, Decision Vacating Reexam in Inter Partes Reexamination of U.S. Pat. No. 7,749,024 (U.S. Appl. No. 95/000,573), Aug. 2, 2016, 6 pages, U.S.
United States Patent and Trademark Office, Decision: Rehearing Granted in Part, in Inter Partes Reexamination of U.S. Pat. No. 7,557,301 (U.S. Appl. No. 95/000,696), May 2, 2016, 17 pages, U.S.A.
United States Patent and Trademark Office, Electronic Approval of Terminal Disclaimer for U.S. Appl. No. 14/858,872, filed Apr. 30, 2019, 1 page, USA.
United States Patent and Trademark Office, Electronic Approval of Terminal Disclaimer for U.S. Appl. No. 15/590,881, filed Apr. 30, 2019, 1 page, USA.
United States Patent and Trademark Office, Electronic Approval of Terminal Disclaimer for U.S. Appl. No. 16/015,688, filed Apr. 30, 2019, 1 page, USA.
United States Patent and Trademark Office, Electronic Approval of Terminal Disclaimer for U.S. Appl. No. 16/015,716, filed Apr. 30, 2019, 1 page, USA.

(56) References Cited

OTHER PUBLICATIONS

United States Patent and Trademark Office, Electronic Approval of Terminal Disclaimer for U.S. Appl. No. 15/590,881, filed May 2, 2018, 1 pages, U.S.A.
United States Patent and Trademark Office, Ex Parte Reexamination Ordered of U.S.P.N. 8,382,518 (U.S. Appl. No. 96/000,144), Sep. 8, 2016, 2 pages, U.S.
United States Patent and Trademark Office, Ex Parte Reexamination Certificate for U.S. Appl. No. 96/000,144 (U.S. Pat. No. 8,382,518), Jan. 26, 2018, 2 pages, U.S.A.
United States Patent and Trademark Office, Examiner's Answer in Inter Partes Reexamination of U.S. Pat. No. 7,749,024 (U.S. Appl. No. 95/000,594), Dec. 4, 2013, 3 pages, U.S.
United States Patent and Trademark Office, Examiner's Answer in Inter Partes Reexamination of U.S. Pat. No. 8,043,119 (U.S. Appl. No. 95/000,695), Feb. 4, 2015, 3 pages, U.S.
United States Patent and Trademark Office, Examiner's Answer in Inter Partes Reexamination of U.S. Pat. No. 7,557,301 (U.S. Appl. No. 95/000,696), Aug. 28, 2014, 3 pages, U.S.
United States Patent and Trademark Office, Examiner's Answer to Appeal Brief in Inter Partes Reexamination of U.S. Pat. No. 7,411,129 (U.S. Appl. No. 95/000,403), Sep. 21, 2012, 12 pages, U.S.
United States Patent and Trademark Office, Examiner's Determination on Patent Owner and Requester Comments after Board Decision in Inter Partes Reexamination of U.S. Pat. No. 7,411,129 (U.S. Appl. No. 95/000,403), Dec. 30, 2014, 15 pages, U.S.
United States Patent and Trademark Office, Examiner's Determination on Patent Owner's Response for U.S. Appl. No. 95/000,695, filed Oct. 11, 2018, 23 pages, U.S.A.
United States Patent and Trademark Office, Examiner's Determination after Board Decision for Control No. U.S. Appl. No. 95/000,695, filed Nov. 14, 2018, 23 pages, USA.
United States Patent and Trademark Office, Examiner's Ex Parte Reexamination Interview Summary for Ex Parte Reexamination of U.S. Pat. No. 8,382,518 (U.S. Appl. No. 96/000,144), Jan. 9, 2017, 3 pages, U.S.A.
United States Patent and Trademark Office, Final Office Action for U.S. Appl. No. 15/590,881, filed Apr. 4, 2019, 20 pages, USA.
United States Patent and Trademark Office, Final Office Action for U.S. Appl. No. 16/015,716, filed Nov. 7, 2019, (33 pages). U.S.
United States Patent and Trademark Office, Final Office Action in Ex Parte Reexamination of U.S. Pat. No. 8,382,518 (U.S. Appl. No. 96/000,144), Jul. 14, 2017, 74 pages, U.S.A.
United States Patent and Trademark Office, Inter Partes Reexamination Certificate (1535$^{th}$) U.S. Pat. No. 7,557,301 C2 in Inter Partes Reexamination of U.S. Pat. No. 7,557,301 (U.S. Appl. No. 95/000,696), Jun. 14, 2018, 2 pages, U.S.
United States Patent and Trademark Office, Interview Attachment (Miscellaneous Internal Document) in Ex Parte Reexamination of U.S. Pat. No. 8,382,518 (U.S. Appl. No. 96/000,144), May 3, 2017, 14 pages, U.S.A.
United States Patent and Trademark Office, Issuance of Supplemental Examination Certificate U.S. Pat. No. 8,382,518 F1 (U.S. Appl. No. 96/000,144), Aug. 16, 2016, 2 pages, U.S.
United States Patent and Trademark Office, Letter Restarting Period for Response for U.S. Appl. No. 16/015,688, filed Nov. 5, 2018, 15 pages, U.S.A.
United States Patent and Trademark Office, Miscellaneous Action with SSP for U.S. Appl. No. 10/952,294, filed Mar. 4, 2008, 9 pages, U.S.
United States Patent and Trademark Office, NonFinal Office Action for U.S. Appl. No. 16/015,688, filed Jul. 12, 2019, (18 pages), USA.
United States Patent and Trademark Office, NonFinal Office Action for U.S. Appl. No. 15/590,881, filed Nov. 29, 2019, (14 pages). U.S.
United States Patent and Trademark Office, NonFinal Office Action for U.S. Appl. No. 14/858,872, filed Nov. 29, 2019, (19 pages), U.S.
United States Patent and Trademark Office, NonFinal Office Action for U.S. Appl. No. 16/015,688, filed Dec. 26, 2019, (21 pages), USA.
United States Patent and Trademark Office, Notice of Allowance for U.S. Appl. No. 14/620,963, filed May 22, 2019, 19 pages, USA.
United States Patent and Trademark Office, Notice of Allowance for U.S. Appl. No. 10/952,294, filed Oct. 12, 2007, 8 pages, U.S.
United States Patent and Trademark Office, Notice of Allowance for U.S. Appl. No. 10/952,294, filed Dec. 31, 2007, 9 pages, U.S.
United States Patent and Trademark Office, Notice of Allowance for U.S. Appl. No. 10/952,294, filed Mar. 25, 2008, 12 pages, U.S.
United States Patent and Trademark Office, Notice of Allowance for U.S. Appl. No. 10/952,294, filed Apr. 30, 2008, 11 pages, U.S.
United States Patent and Trademark Office, Notice of Allowance for U.S. Appl. No. 10/952,294, filed Jun. 27, 2008, 9 pages, U.S.
United States Patent and Trademark Office, Notice of Allowance for U.S. Appl. No. 11/675,441, filed Apr. 6, 2010, 10 pages, U.S.
United States Patent and Trademark Office, Notice of Allowance for U.S. Appl. No. 12/017,222, filed Dec. 5, 2008, 17 pages, U.S.
United States Patent and Trademark Office, Notice of Allowance for U.S. Appl. No. 12/017,222, filed Jan. 8, 2009, 15 pages, U.S.
United States Patent and Trademark Office, Notice of Allowance for U.S. Appl. No. 12/017,222, filed Feb. 27, 2009, 11 pages, U.S.
United States Patent and Trademark Office, Notice of Allowance for U.S. Appl. No. 12/497,586, filed Aug. 8, 2012, 24 pages, U.S.
United States Patent and Trademark Office, Notice of Allowance for U.S. Appl. No. 12/497,586, filed Nov. 18, 2013, 17 pages, U.S.
United States Patent and Trademark Office, Notice of Allowance for U.S. Appl. No. 12/787,877, filed Aug. 3, 2011, 9 pages, U.S.
United States Patent and Trademark Office, Notice of Allowance for U.S. Appl. No. 13/274,052, filed Aug. 17, 2012, 22 pages, U.S.
United States Patent and Trademark Office, Notice of Allowance for U.S. Appl. No. 13/274,052, filed Dec. 12, 2012, 16 pages, U.S.
United States Patent and Trademark Office, Notice of Allowance for U.S. Appl. No. 13/774,677, filed Apr. 30, 2013, 9 pages, U.S.
United States Patent and Trademark Office, Notice of Allowance for U.S. Appl. No. 13/774,677, filed Aug. 21, 2013, 21 pages, U.S.
United States Patent and Trademark Office, Notice of Allowance for U.S. Appl. No. 14/144,150, filed Nov. 18, 2014, 24 pages, U.S.
United States Patent and Trademark Office, Notice of Allowance for U.S. Appl. No. 14/144,150, filed May 22, 2015, 6 pages, U.S.
United States Patent and Trademark Office, Notice of Allowance for U.S. Appl. No. 15/068,150, filed Jul. 19, 2016, 48 pages, U.S.
United States Patent and Trademark Office, Notice of Allowance for U.S. Appl. No. 14/858,872, filed Apr. 12, 2017, 8 pages, U.S.A.
United States Patent and Trademark Office, Notice of Hearing in Inter Partes Reexamination of U.S. Pat. No. 7,557,301 (U.S. Appl. No. 95/000,696), Jun. 8, 2015, 4 pages, U.S.
United States Patent and Trademark Office, Notice of Intent to Issue a Reexam Certificate in Inter Partes Reexamination of U.S. Pat. No. 7,749,024 (U.S. Appl. No. 95/000,594), Jul. 12, 2013, 14 pages, U.S.
United States Patent and Trademark Office, Notice of Intent to Issue Inter Partes Reexamination Certificate in Inter Partes Reexamination of U.S. Pat. No. 7,749,024 (U.S. Appl. No. 95/000,594) and Office Action, Jun. 7, 2016, 7 pages, U.S.A.
United States Patent and Trademark Office, Notice of Intent to Issue An Ex Parte Reexam Certificate for U.S. Appl. No. 96/000,144, filed Oct. 10, 2017, 7 pages, U.S.A.
United States Patent and Trademark Office, Notice of Intent to Issue a Reexam Certificate in Inter Partes Reexamination of U.S. Pat. No. 7,557,301 (U.S. Appl. No. 95/000,696), May 18, 2018, 7 pages, U.S.
United States Patent and Trademark Office, Notice of Intent to Reissue in Ex Parte Reexamination of U.S. Pat. No. 7,557,301 (U.S. Appl. No. 90/009,589 and U.S. Appl. No. 90/009,592), Sep. 21, 2011, 8 pages, U.S.
United States Patent and Trademark Office, Notice of Panel Decision From Pre-Appeal Brief Review for U.S. Appl. No. 15/590,881, filed Sep. 3, 2019, (2 pages), USA.
United States Patent and Trademark Office, Notification of Appeal Hearing for U.S. Appl. No. 14/620,963, filed Feb. 26, 2019, 3 pages, USA.

(56) References Cited

OTHER PUBLICATIONS

United States Patent and Trademark Office, Notification of Reopening Prosecution Due to Information Disclosure Statement Filed after of a Notice of Allowance for U.S. Appl. No. 14/858,872, filed Feb. 8, 2018, 6 pages, U.S.A.
United States Patent and Trademark Office, Office Action for U.S. Appl. No. 14/858,872, filed Dec. 22, 2016, 5 pages, U.S.A.
United States Patent and Trademark Office, Office Action for U.S. Appl. No. 10/952,294, filed Jul. 12, 2006, 17 pages, U.S.
United States Patent and Trademark Office, Office Action for U.S. Appl. No. 10/952,294, filed Mar. 14, 2007, 12 pages, U.S.
United States Patent and Trademark Office, Office Action for U.S. Appl. No. 10/952,294, filed May 30, 2007, 8 pages, U.S.
United States Patent and Trademark Office, Office Action for U.S. Appl. No. 10/952,294, filed Aug. 7, 2007, 12 pages, U.S.
United States Patent and Trademark Office, Office Action for U.S. Appl. No. 11/120,487, filed Nov. 2, 2005, 6 pages, U.S.
United States Patent and Trademark Office, Office Action for U.S. Appl. No. 11/120,487, filed Jan. 5, 2006, 10 pages, U.S.
United States Patent and Trademark Office, Office Action for U.S. Appl. No. 11/120,487, filed Jun. 8, 2006, 15 pages, U.S.
United States Patent and Trademark Office, Office Action for U.S. Appl. No. 11/135,807, filed Dec. 15, 2005, 10 pages, U.S.
United States Patent and Trademark Office, Office Action for U.S. Appl. No. 11/135,807, filed Jun. 8, 2006, 15 pages, U.S.
United States Patent and Trademark Office, Office Action for U.S. Appl. No. 11/135,986, filed Jul. 12, 2006, 10 pages, U.S.
United States Patent and Trademark Office, Office Action for U.S. Appl. No. 11/135,986, filed Mar. 14, 2007, 11 pages, U.S.
United States Patent and Trademark Office, Office Action for U.S. Appl. No. 11/313,596, filed Mar. 20, 2007, 16 pages, U.S.
United States Patent and Trademark Office, Office Action for U.S. Appl. No. 11/410,820, filed Jun. 11, 2009, 10 pages, U.S.
United States Patent and Trademark Office, Office Action for U.S. Appl. No. 11/675,441, filed Dec. 28, 2007, 5 pages, U.S.
United States Patent and Trademark Office, Office Action for U.S. Appl. No. 11/675,441, filed Oct. 6, 2008, 13 pages, U.S.
United States Patent and Trademark Office, Office Action for U.S. Appl. No. 11/675,441, filed Jun. 25, 2009, 11 pages, U.S.
United States Patent and Trademark Office, Office Action for U.S. Appl. No. 11/675,441, filed Dec. 9, 2009, 6 pages, U.S.
United States Patent and Trademark Office, Office Action for U.S. Appl. No. 11/858,766, filed Jun. 9, 2008, 8 pages, U.S.
United States Patent and Trademark Office, Office Action for U.S. Appl. No. 11/858,766, filed Feb. 9, 2009, 11 pages, U.S.
United States Patent and Trademark Office, Office Action for U.S. Appl. No. 12/017,222, filed Aug. 7, 2008, 16 pages, U.S.
United States Patent and Trademark Office, Office Action for U.S. Appl. No. 12/497,586, filed Jul. 7, 2011, 6 pages, U.S.
United States Patent and Trademark Office, Office Action for U.S. Appl. No. 12/497,586, filed Mar. 30, 2012, 20 pages, U.S.
United States Patent and Trademark Office, Office Action for U.S. Appl. No. 12/787,877, filed Oct. 28, 2010, 13 pages, U.S.
United States Patent and Trademark Office, Office Action for U.S. Appl. No. 13/274,052, filed Nov. 23, 2011, 8 pages, U.S.
United States Patent and Trademark Office, Office Action for U.S. Appl. No. 14/620,963, filed Apr. 6, 2016, 16 pages, U.S.A.
United States Patent and Trademark Office, Office Action for U.S. Appl. No. 14/858,872, filed Sep. 9, 2016, 52 pages, U.S.
United States Patent and Trademark Office, Office Action for U.S. Appl. No. 15/590,881, filed Nov. 2, 2017, 11 pages, U.S.A.
United States Patent and Trademark Office, Office Action for U.S. Appl. No. 14/620,963, filed Nov. 12, 2015, 10 pages, U.S.A.
United States Patent and Trademark Office, Office Action for U.S. Appl. No. 14/858,872, filed Jun. 14, 2018, 37 pages, U.S.
United States Patent and Trademark Office, Office Action for U.S. Appl. No. 15/590,881, filed Sep. 5, 2018, 61 pages, U.S.A.
United States Patent and Trademark Office, Office Action for U.S. Appl. No. 16/015,688, filed Sep. 20, 2018, 65 pages, U.S.A.

United States Patent and Trademark Office, Office Action for U.S. Appl. No. 16/015,716, filed Nov. 16, 2018, 70 pages, USA.
United States Patent and Trademark Office, Office Action for Ex Parte Reexam of U.S. Pat. No. 8,382,518 (U.S. Appl. No. 96/000,144), Sep. 8, 2016, 36 pages, U.S.
United States Patent and Trademark Office, Office Action for Inter Partes Reexamination of U.S. Pat. No. 8,043,119 (U.S. Appl. No. 95/000,695), Feb. 14, 2014, 116 pages, U.S.
United States Patent and Trademark Office, Office Action in Ex Parte Examination of U.S. Pat. No. 7,557,301 (U.S. Appl. No. 90/009,589), May 4, 2010, 31 pages, U.S.
United States Patent and Trademark Office, Office Action in Ex Parte Reexamination of U.S. Pat. No. 7,557,301 (U.S. Appl. No. 90/009,592), Sep. 24, 2010, 16 pages, U.S.
United States Patent and Trademark Office, Office Action in Ex Parte Reexamination of U.S. Pat. No. 7,557,301 (U.S. Appl. No. 90/009,589 and U.S. Appl. No. 90/009,592), Jun. 23, 2011, 24 pages, U.S.
United States Patent and Trademark Office, Office Action in Ex Parte Reexamination of U.S. Pat. No. 8,382,518 (U.S. Appl. No. 96/000,144), Mar. 20, 2017, 149 pages, U.S.A.
United States Patent and Trademark Office, Order Granting Ex Parte Examination of U.S. Pat. No. 7,557,301 (U.S. Appl. No. 90/009,589), Dec. 18, 2009, 20 pages, U.S.
United States Patent and Trademark Office, Order Granting Ex Parte Reexamination of U.S. Pat. No. 7,557,301 (U.S. Appl. No. 90/009,592), Feb. 5, 2010, 12 pages, U.S.
United States Patent and Trademark Office, Order Granting Inter Partes Reexamination of U.S. Pat. No. 7,411,129 and Office Action (U.S. Appl. No. 95/000,403), Dec. 5, 2008, 50 pages, U.S.
United States Patent and Trademark Office, Order Granting Inter Partes Reexamination of U.S. Pat. No. 7,749,024 (U.S. Appl. No. 95/000,594) and Office Action, Feb. 11, 2011, 46 pages, U.S.
United States Patent and Trademark Office, Order Granting Inter Partes Reexamination of U.S. Pat. No. 8,043,119 (U.S. Appl. No. 95/000,695) and Office Action, Nov. 13, 2012, 74 pages, U.S.
United States Patent and Trademark Office, Order Granting Reexamination and Office Action in Inter Partes Reexamination of U.S. Pat. No. 7,557,301 (U.S. Appl. No. 95/000,696), Dec. 11, 2012, 43 pages, U.S.
United States Patent and Trademark Office, Order Remanding Inter Partes Reexamination to the Examiner, Inter Partes Reexamination of U.S. Pat. No. 8,043,119 (U.S. Appl. No. 95/000,695), Jun. 5, 2018, 10 pages, U.S.
United States Patent and Trademark Office, Patent Board Decision on Appeal Affirming Examiner in Part for U.S. Appl. No. 95/000,695, filed Jan. 16, 2018, 37 pages, U.S.A.
United States Patent and Trademark Office, Patent Board Decision—Examiner Affirmed in Inter Partes Reexamination of U.S. Pat. No. 7,749,024 (U.S. Appl. No. 95/000,594), Jul. 16, 2014, 20 pages, U.S.
United States Patent and Trademark Office, Patent Board Decision, Examiner Affirmed In-Part in Inter Partes Reexamination of U.S. Pat. No. 7,411,129 (U.S. Appl. No. 95/000,403), Jan. 31, 2014, 24 pages, U.S.
United States Patent and Trademark Office, Patent Board Remand to Examiner in Inter Partes Reexamination of U.S. Pat. No. 7,411,129 (U.S. Appl. No. 95/000,403), Jun. 13, 2014, 9 pages, U.S.
United States Patent and Trademark Office, Patent Trial and Appeal Board Docketing Notice, for Control No. U.S. Appl. No. 95/000,695, filed Feb. 5, 2019, 3 pages, USA.
United States Patent and Trademark Office, Petition Decision in Inter Partes Reexamination of U.S. Pat. No. 7,411,129 (U.S. Appl. No. 95/000,403), May 27, 2010, 6 pages, U.S.
United States Patent and Trademark Office, Petition Decision in Inter Partes Reexamination of U.S. Pat. No. 7,411,129 (U.S. Appl. No. 95/000,403), Jul. 7, 2010, 6 pages, U.S.
United States Patent and Trademark Office, Petition Decision in Inter Partes Reexamination of U.S. Pat. No. 7,557,301 (U.S. Appl. No. 95/000,696), Feb. 26, 2014, 4 pages, U.S.
United States Patent and Trademark Office, Petition Decision—Dismissed in Inter Partes Reexamination of U.S. Pat. No. 7,749,024 (U.S. Appl. No. 95/000,594), Nov. 20, 2012, 7 pages, U.S.

(56) References Cited

OTHER PUBLICATIONS

United States Patent and Trademark Office, Petition Decisions in Inter Partes Reexamination of U.S. Pat. No. 7,411,129 (U.S. Appl. No. 95/000,403), Aug. 10-11, 2010, 12 pages, U.S.
United States Patent and Trademark Office, Petition Decisions in Inter Partes Reexamination of U.S. Pat. No. 7,411,129 (U.S. Appl. No. 95/000,403), Oct. 19 and 22, 2010, 17 pages, U.S.
United States Patent and Trademark Office, Prioritized Examination Granted for U.S. Appl. No. 15/068,150, filed Jun. 16, 2016, 5 pages, U.S.A.
United States Patent and Trademark Office, Proceeding Forwarded to Patent Trial and Appeal Board Inter Partes Reexamination of U.S. Pat. No. 8,043,119 (U.S. Appl. No. 95/000,695), Mar. 23, 2015, 3 pages, U.S.
United States Patent and Trademark Office, PTAB Decision on Appeal in Inter Partes Reexamination of U.S. Pat. No. 7,557,301 (U.S. Appl. No. 95/000,696), Sep. 29, 2015, 28 pages, U.S.
United States Patent and Trademark Office, PTAB Docketing Notice in Inter Partes Reexamination of U.S. Pat. No. 7,411,129 (U.S. Appl. No. 95/000,403), Jun. 2, 2016, 3 pages, U.S.
United States Patent and Trademark Office, PTAB Docketing Notice Transmitted to Third Party Requestor in Inter Partes Reexamination of U.S. Pat. No. 7,411,129 (U.S. Appl. No. 95/000,403), Jun. 2, 2016, 5 pages, U.S.A.
United States Patent and Trademark Office, Reasons for Substantial New Question of Patentability Determination for U.S. Pat. No. 8,382,518 (U.S. Appl. No. 96/000,144), Aug. 16, 2016, 32 pages, U.S.
United States Patent and Trademark Office, Record of Oral Hearing Held: Aug. 19, 2015 in Inter Partes Reexamination of U.S.P.N. 7,557,301 (U.S. Appl. No. 95/000,696), Sep. 15, 2015, 44 pages, U.S.
United States Patent and Trademark Office, Reexam Petition Decision—Granted in Inter Partes Reexamination of U.S. Pat. No. 7,749,024 (U.S. Appl. No. 95/000,594), Oct. 25, 2013, 8 pages, U.S.
United States Patent and Trademark Office, Reexamination Certificate Issued for U.S. Pat. No. 7,557,301 (U.S. Appl. No. 90/009,589 and U.S. Appl. No. 90/009,592), Dec. 27, 2011, 4 pages, U.S.
United States Patent and Trademark Office, Right of Appeal Notice in Inter Partes Reexamination of U.S. Pat. No. 7,749,024 (U.S. Appl. No. 95/000,594), Oct. 25, 2012, 162 pages, U.S.
United States Patent and Trademark Office, Right of Appeal Notice Prosecution for Inter Partes Reexamination of U.S. Pat. No. 8,043,119 (U.S. Appl. No. 95/000,695), Aug. 28, 2014, 7 pages, U.S.
United States Patent and Trademark Office, Right of Notice of Appeal in Inter Partes Reexamination of U.S. Pat. No. 7,411,129 (U.S. Appl. No. 95/000,403), Mar. 30, 2010, 23 pages, U.S.
United States Patent and Trademark Office, Right of Notice to Appeal in Inter Partes Reexamination of U.S. Pat. No. 7,557,301 (U.S. Appl. No. 95/000,696), Jan. 17, 2014, 83 pages, U.S.
United States Patent and Trademark Office, Right of Notice to Appeal in Inter Partes Reexamination of U.S. Pat. No. 7,557,301 (U.S. Appl. No. 95/000,696), Feb. 19, 2014, 87 pages, U.S.
United States Patent and Trademark Office, Status Inquiry, for U.S. Appl. No. 14/858,872, filed Feb. 14, 2019, 3 pages, USA.
United States Patent and Trademark Office, Summary of Applicant Initiated Interview for U.S. Appl. No. 15/590,881, filed Apr. 6, 2018, 4 pages, U.S.A.
United States Patent and Trademark Office, Supplemental Appeal Brief for U.S. Appl. No. 14/620,963, filed Apr. 29, 2019, 8 pages, USA.
United States Patent and Trademark Office, Supplemental Notice of Allowability for U.S. Appl. No. 13/274,052, filed Jan. 11, 2013, 3 pages, U.S.
United States Patent and Trademark Office, Transmittal of Communication to Third Party Requester Inter Partes Reexamination, for Control No. U.S. Appl. No. 95/000,695, filed Feb. 5, 2019, 5 pages, USA.
U.S. Appl. No. 14/666,105, Preliminary Amendment Claims, Mar. 23, 2015, 5 pages.
U.S. Appl. No. 14/858,872, Preliminary Amendment Claims, Sep. 18, 2015, 6 pages.
Wild, Frank, "The Effects of Silicone Polymer Additions on the Processing and Properties of an Isotactic Propylene Homopolymer", Dissertation, Sep. 1995, The Manchester Metropolitan University.
Wiles, John, "Clarifying Confusing Cables", Home Power #66, Aug./Sep. 1998, pp. 82-84.
WITCO Corporation, Brochure entitled "Fatty Acids, Glycerine, Triglycerides", (1997) (22pp).
Yellow 77® document, Ideal Industries GmbH, 1 pg., 2003.
Decision On Request For Rehearing, for Re-Examination Control No. 95/000,695, dated Sep. 16, 2022, 21 pages, United States Patent and Trademark Office, US.

* cited by examiner

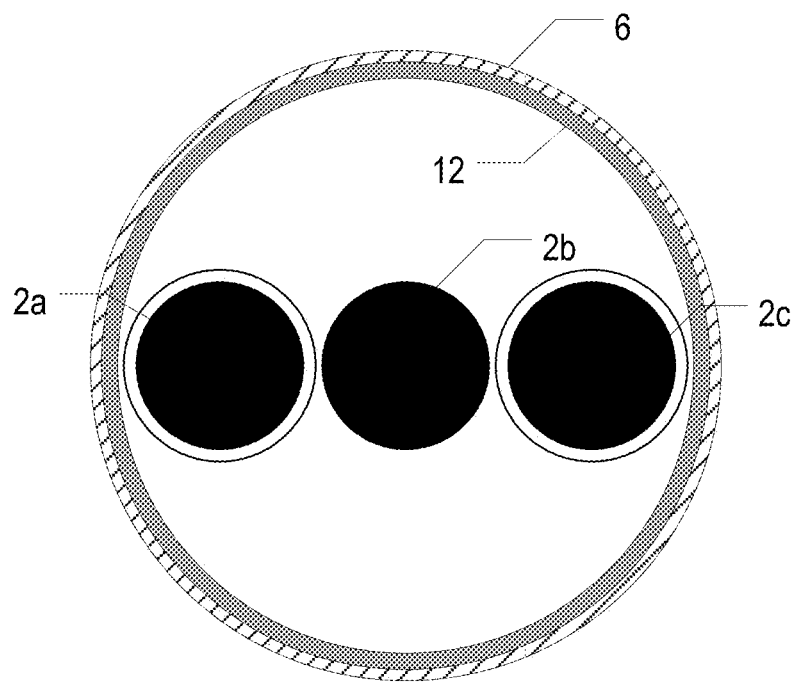
FIG. 2A-A
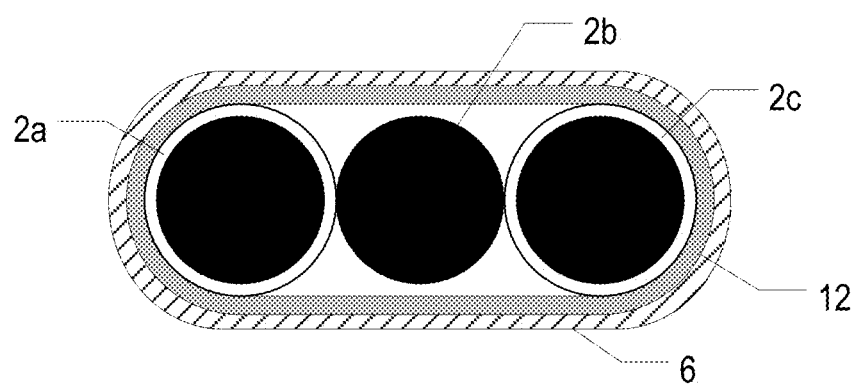
FIG. 2B-B

NON-CIRCULAR ELECTRICAL CABLE HAVING A REDUCED PULLING FORCE

CROSS-REFERENCE TO RELATED APPLICATIONS

This patent application is a continuation of U.S. patent application Ser. No. 16/918,688, filed Jul. 1, 2020, which is a continuation of U.S. patent application Ser. No. 15/840,911, filed Dec. 13, 2017 and now issued as U.S. Pat. No. 10,741,310, which is a continuation of U.S. patent application Ser. No. 14/620,963, filed Feb. 12, 2015 and now issued as U.S. Pat. No. 10,431,350, the contents of all of which are incorporated herein by reference in their entirety.

BACKGROUND

Non-metallic sheathed cable, such as NM-B type cable, is often used for providing electrical systems within residential structures. Known non-metallic sheathed cable assemblies often comprise one or more electrical conductors individually coated in an electrical insulator (e.g., a solid or stranded copper wire coated in a plastic material) bundled together and collectively sheathed in a non-metallic outer sheath. Generally the non-metallic outer sheath comprises a non-conductive polymer such as poly-vinyl chloride (PVC) and has been understood to provide mechanical protection for the bundled wires against insulation tears and abrasion.

During installation, these cables often must be threaded through a series of rough-hewn holes cut through wooden floor and ceiling joists, headers, and wall studs (such as those commonly referred to as 2×4s, 2×6s, 2×8s, and/or the like) or through narrow plastic conduit. Due to time pressures involved in installing electrical cable and the often complex shapes of walls and structures included in residential buildings, the electrical cable installation path comprises a substantially non-linear path through multiple wooden studs. These cable installation paths often run substantially horizontally through a series of wooden wall studs, turn around corners to follow additional path segments substantially perpendicular to previous segments, and turn vertically to run along the length of wooden wall studs to electrical outlets, wall mounted switches, or ceiling mounted light sources.

The exterior surfaces of the non-metallic sheathed cables often have a high dynamic coefficient of friction, and therefore installation of these cables along the installation path may require a substantial pull force to overcome the frictional force occurring between the non-metallic sheathed cable and the surfaces of the installation path while the cable is being pulled. In some installations, the pulling force necessary to move the cable through the installation path may be high enough to deform or tear the outer non-metallic sheath. Therefore, when installing long segments of non-metallic sheathed cable, multiple installers may be necessary to thread the non-metallic sheathed cable along the installation path. A first installer may be necessary to push lengths of cable into the installation path, and one or more additional installers may be necessary to pull the provided lengths of cable along the installation path.

Electricians and installers have previously coated non-metallic sheathed cables with a separate cable lubricant, often in the form of a liquid or gel, at the installation site to reduce the coefficient of friction of non-metallic sheathed cables. Applying these separate cable lubricants at the job site may require additional installation time, can be messy, and, depending on the chemical composition of the lubricant, may negatively impact the mechanical and insulative properties of the non-metallic sheath.

As noted in U.S. Pat. No. 7,411,129 to Kummer et al., incorporated herein by reference, and patents and patent applications related thereto, advances have been made in decreasing the pulling force necessary to install electrical conductors in substantially non-linear installation paths. These advances include sheath formulations wherein nylon or another polymer is mixed with a lubricant and formed over the outside of the conductor in order to decrease the surface coefficient of friction. However, these efforts have been directed to generally circular conductors, such as circular Thermoplastic High Heat Resistant Nylon (THHN) wiring or the like.

In many residential installations, however, substantially flat or non-circular cables, such as Southwire's Romex® 14/2, 12/2, or 10/2 cable, are used for a substantial portion of electrical wiring. Such cable may comprise two separately insulated conductors and a separate ground wire arranged in a substantially flat arrangement (e.g., the center point of each of the three wires are nominally aligned in a single plane). The three wires are encapsulated in a non-metallic outer sheath as described above. As noted herein, previous attempts to decrease the pulling force necessary for installation of non-metallic sheathed cables have been limited to circular wires and cables. Physical characteristics of the materials utilized in the reduction of the surface coefficient of friction for non-metallic sheathed cables have previously limited the commercial manufacture of previously known methods and materials to circular cables and wires. Moreover, product safety and certification organizations, such as the Underwriters Laboratory (UL), have implemented sheath thickness and uniformity standards for non-metallic sheathed cables, highlighting the importance of a uniform sheath thickness. Therefore, new manufacturing methods are needed to consistently produce non-circular, non-metallic sheathed cable with a reduced surface coefficient of friction in order to decrease the pull force necessary to install these cables in generally non-linear cable installation paths.

BRIEF SUMMARY

Various embodiments of the present invention are directed to a process for producing non-circular electrical cable, wherein the non-circular electrical cable comprises one or more conductors arranged in a non-circular arrangement and an exterior sheath comprising a first sheath layer and a second sheath layer. A process according to various embodiments of the present invention comprises steps for: (1) advancing conductors through an extruder head, (2) extruding a first sheath layer comprising a plastic material around the conductors, wherein the first sheath layer is initially extruded in a substantially circular shape having an inner surface and an exterior surface and at least a portion of the inner surface thereof is spaced from the conductors, (3) extruding a second sheath layer comprising a nylon material onto the exterior surface of the first sheath layer, (4) applying a negative pressure to the interior surface of the first sheath layer, thereby pulling the first sheath layer and second sheath layer onto the conductors and into a non-circular shape having a cross section substantially similar to the combined cross section of the one or more conductors, and (5) cooling the first and second sheath layers. In various embodiments, the second sheath layer may additionally comprise a lubricant for decreasing the pull force of the cable.

In addition, various embodiments of the present invention are directed to a non-circular electrical cable comprising one or more conductors arranged in a non-circular arrangement and an exterior sheath loosely surrounding the conductors having a non-circular cross-section, the exterior sheath comprising a first sheath layer and a second sheath layer. In various embodiments, the first sheath layer has an exterior surface and an interior surface, and comprises a plastic material. In various embodiments, the second sheath layer may have an exterior surface and an interior surface, and comprises a polyamide, such as a nylon material. Additionally, the second sheath layer may comprise a lubricant for decreasing the pull force of the cable.

Yet other embodiments of the present invention are directed to a non-circular electrical cable comprising one or more conductors arranged in a non-circular arrangement and an exterior sheath loosely surrounding the conductors having a non-circular cross-section, the exterior sheath comprising a first sheath layer and a second sheath layer. In various embodiments, the first sheath layer has an exterior surface and an interior surface, and comprises a plastic material. In various embodiments, the second sheath layer may have an exterior surface and an interior surface, and comprises a polyolefin (e.g., polypropylene). Additionally, the second sheath layer may comprise a lubricant for decreasing the pull force of the cable.

Yet other embodiments of the present invention are directed to a non-circular electrical cable comprising one or more conductors arranged in a non-circular arrangement and an exterior sheath loosely surrounding the conductors having a non-circular cross-section, the exterior sheath comprising a first sheath layer and a second sheath layer. In various embodiments, the first sheath layer has an exterior surface and an interior surface, and comprises a plastic material. In various embodiments, the second sheath layer may have an exterior surface and an interior surface, and comprises a polyester. Additionally, the second sheath layer may comprise a lubricant for decreasing the pull force of the cable.

BRIEF DESCRIPTION OF THE SEVERAL VIEWS OF THE DRAWINGS

Reference will now be made to the accompanying drawings, which are not necessarily drawn to scale, and wherein:

FIGS. 2A-A and 2B-B show exemplary cross sectional views of a sheathed cable at various points during the manufacturing process, according to one embodiment of the present invention;

DETAILED DESCRIPTION

The present invention will now be described more fully hereinafter with reference to the accompanying drawings, in which some, but not all embodiments of the invention are shown. Indeed, the invention may be embodied in many different forms and should not be construed as limited to the embodiments set forth herein. Rather, these embodiments are provided so that this disclosure will satisfy applicable legal requirements. Like numbers refer to like elements throughout.

Figure 1:
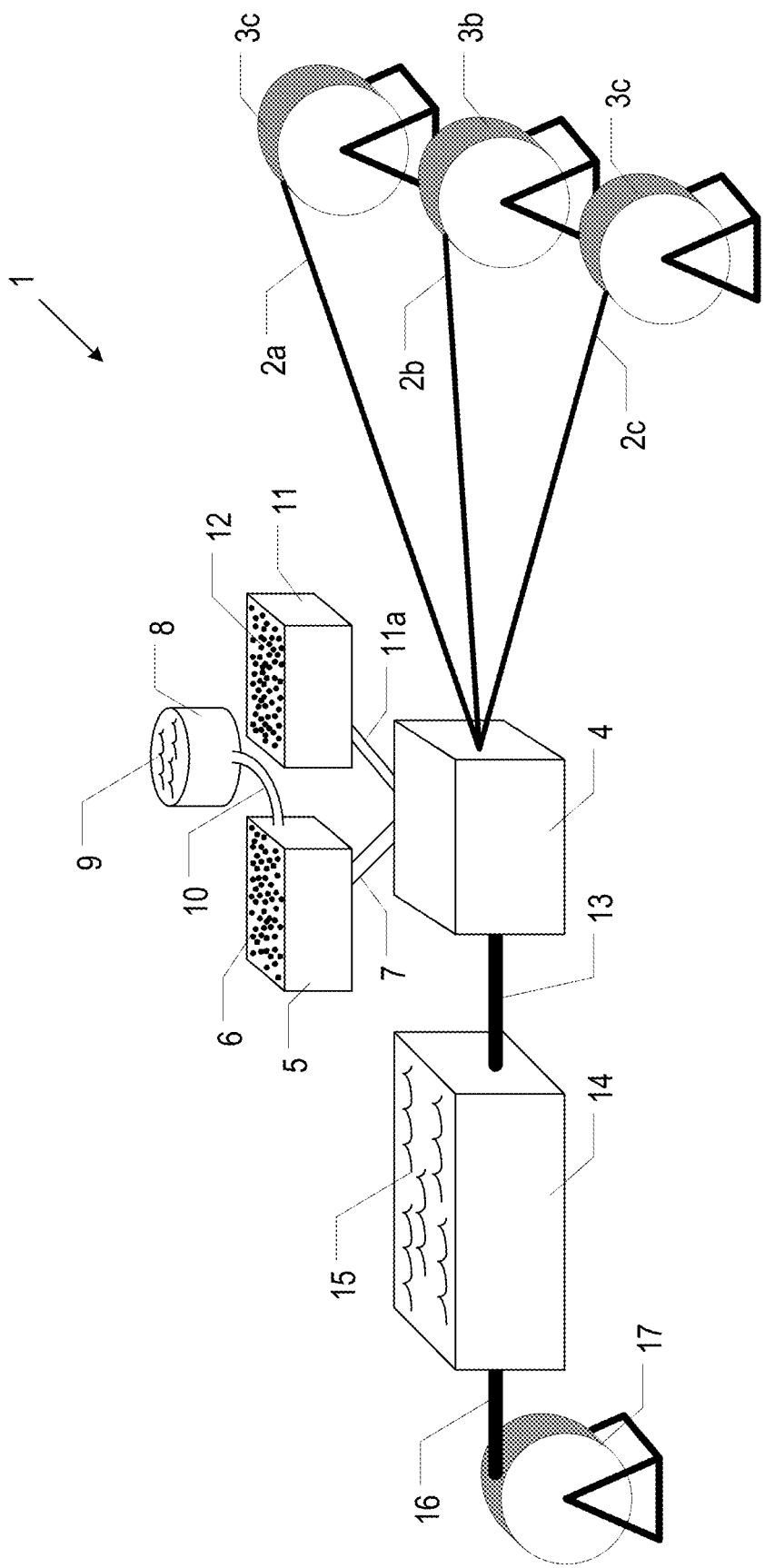
FIG. 1 shows an exemplary schematic of a system utilized to produce non-metallic sheathed cable according to one embodiment of the present invention.

Referring initially to FIG. 1, there is depicted a schematic diagram of exemplary equipment 1 utilized to produce an electrical cable according to one embodiment of the present invention, usable equipment is described in co-pending U.S. patent application Ser. No. 14/620,963, filed on Feb. 12, 2015, the entire contents of which is incorporated herein by reference in its entirety. As shown in FIG. 1, multiple conductors 2a, 2b, 2c may be combined to create a multi-conductor cable. In various embodiments, the conductors may comprise multiple insulated conductors 2a, 2c and one bare conductor 2b. For example, various embodiments may comprise two 12-gauge insulated conductors and one 12-gauge bare ground wire and may be commonly referred to as "12/2 wire." Each insulated conductor may comprise a conductive element surrounded by an insulating material. The insulating material may, in certain embodiments, comprise an extruded polymer material such as PVC, a nylon material, and/or other materials having electrical insulative properties. In various embodiments, the PVC may be a foamed PVC material or a re-grind PVC material obtained from recycled PVC products. Although illustrated as comprising three conductors, it will be understood by those skilled in the art that any number of conductors may be utilized herein.

Referring again to FIG. 1, the multiple conductors 2a, 2b, 2c may, in various embodiments, be stored using wire storage devices illustrated in FIG. 1 as a plurality of spools 3a, 3b, 3c. It will be understood by those skilled in the art that any of a variety of wire storage devices may be utilized, including cages, barrels, pallets, and/or the like. The multiple conductors 2a, 2b, 2c may be removed from the wire storage devices during the electrical cable production process as needed, and supplied to an extrusion head 4 during production. Although not shown in FIG. 1, dam paper 28 and/or a paper barrier 29 may also be supplied to the extrusion head 4 in various embodiments. The equipment may additionally include a polyamide-supply tank 5 containing a polyamide 6 (e.g., nylon) used to form a second sheath layer 26 of a resulting cable 13 having a reduced pull force. As illustrated in FIG. 1, the polyamide 6 is illustrated as a plurality of polyamide pellets, however other polyamide forms may be utilized. The polyamide 6 may be supplied to the extruder head 4 during production via a polyamide-supply conduit 7. In various embodiments, the equipment may additionally include an additive-supply tank 8 containing an additive composition 9 (e.g., a fire retardant and/or a lubricant) that may be combined and mixed with the polyamide 6 prior to supplying the resulting mixture to the production process. As a non-limiting example, the additive composition 9 may comprise a lubricant, such as erucamide, a silicon-based material (e.g., a silicon oil), and/or the like configured to further reduce the pull force of the cable attributable to the resulting second sheath layer 26. In various embodiments, the additive composition 9 may be supplied to the polyamide-supply tank 5 where it is mixed with the polyamide 6 to create a substantially homogenous mixture of polyamide and additive composition via an additive-supply conduit 10. The additive composition 9 also, or alternatively, may be supplied directly to the extruder head 4, where it may be combined with the polyamide 6 prior to and/or during an extrusion process. In such a configuration, an extruder (e.g., a twin-screw extruder, not shown) is provided just upstream of the extrusion head 4 and is configured to pressurize, heat, and combine the polyamide 6 and additive 9 in a molten state prior to extruding the combined material. The polyamide 6 and additive 9 may be provided to the extruder in pellet form or molten form.

The equipment 1 may additionally include an insulator-supply tank 11 containing an insulator material 12 configured to supply the insulator material 12 to the extruder head 4 via an insulator-supply conduit 11*a*. In various embodiments, the insulator material 12 may comprise a plastic material having electrical insulative properties, such as PVC, and may be supplied to the extruder in pelletized form or in a molten state. In various embodiments, at least a portion of the PVC may be a re-grind PVC material obtained from recycled PVC products. As illustrated in FIG. 1, the insulator material 12 may be stored in the insulator-supply tank 11 as a plurality of insulator pellets, however the insulator material 12 may be stored in a variety of forms. In various embodiments, the insulator material 12 may be supplied to the extruder head 4 at a location upstream from the polyamide 6 supply location via the insulator-supply conduit 11*a*. In various embodiments, the insulator supply conduit 11*a* may comprise an extruder (e.g., a single-screw extruder, not shown) configured to pressurize and heat the insulator material 12 prior to supplying the insulator material to the extruder head 4. The insulator material 12 may also, or alternatively, be foamed as part of the extrusion process, such that the overall density of the insulator material is reduced. As will be described in greater detail herein, the polyamide 6, additive composition 9, and insulator material 12 may be applied to the conductors in the extruder head 4, such that the resulting cable 13 comprises the multiple conductors 2*a*, 2*b*, 2*c*, surrounded by a multi-layer sheath having at least a first sheath layer 27 comprising the insulator material 12 and a second sheath layer 26 that may comprise the composition of polyamide 6 and additive 9. With the additive 9, the exterior surface of the resulting cable 13 comprises the second sheath layer 26 which results in a cable having a reduced pull force relative to the prior art, thus reducing the pulling force necessary for installing the cable 13 in an installation location.

In various embodiments, the equipment 1 may comprise a cooling box 14 containing a cooling fluid 15. The resulting cable 13 may be fed into the cooling box 14, in order to cool the extruded materials included in the resulting cable 13. The cooling fluid 15 may comprise water, although a variety of alternative cooling fluids may be utilized. The cooled cable 16 may be fed to a cable take-up 17, such as a spool, cage, barrel, and/or the like for transfer and storage. As will be described in greater detail herein, many modifications and other embodiments may be provided according to the terms of this invention. As a non-limiting example, the production process may omit the additive composition 9 entirely, and therefore the equipment 1 may not include the additive-supply tank 8 and additive-supply conduit 10. In various embodiments, the equipment 1 may omit the additive supply tank 8, and the additive composition 9 may be dispersed throughout the polyamide 6, such as a plurality of separate additive composition pellets mixed with the polyamide pellets, or in a plurality of combined pellets, each comprising both polyamide 6 and additive composition 9.

In various embodiments, the polyamide-supply tank 5 may be embodied as a polyolefin-supply tank containing a polyolefin material (e.g., a polypropylene material). In yet other embodiments, the polyamide-supply tank 5 may be embodied as a polyester-supply tank containing a polyester material. In such embodiments, the processing steps described herein in reference to the polyamide-supply tank 5 and polyamide 6 may be performed utilizing the polyolefin-supply tank and polyolefin and/or utilizing the polyester-supply tank and polyester. In such embodiments, the second sheath layer 26 of the resulting cable 13 comprises a polyolefin material and/or a polyester material.

As noted, the polyamide-supply conduit 7 may comprise an extruder assembly (e.g., a twin screw extruder or single screw extruder) configured to heat and supply molten polyamide 6 to the extruder head 4. Similarly, the insulator material supply conduit 11*a* may comprise an extruder assembly (e.g., a twin screw extruder or single screw extruder) configured to heat and supply molten insulator material 12 to the extruder head 4.

Extruder Head

Figure 2:
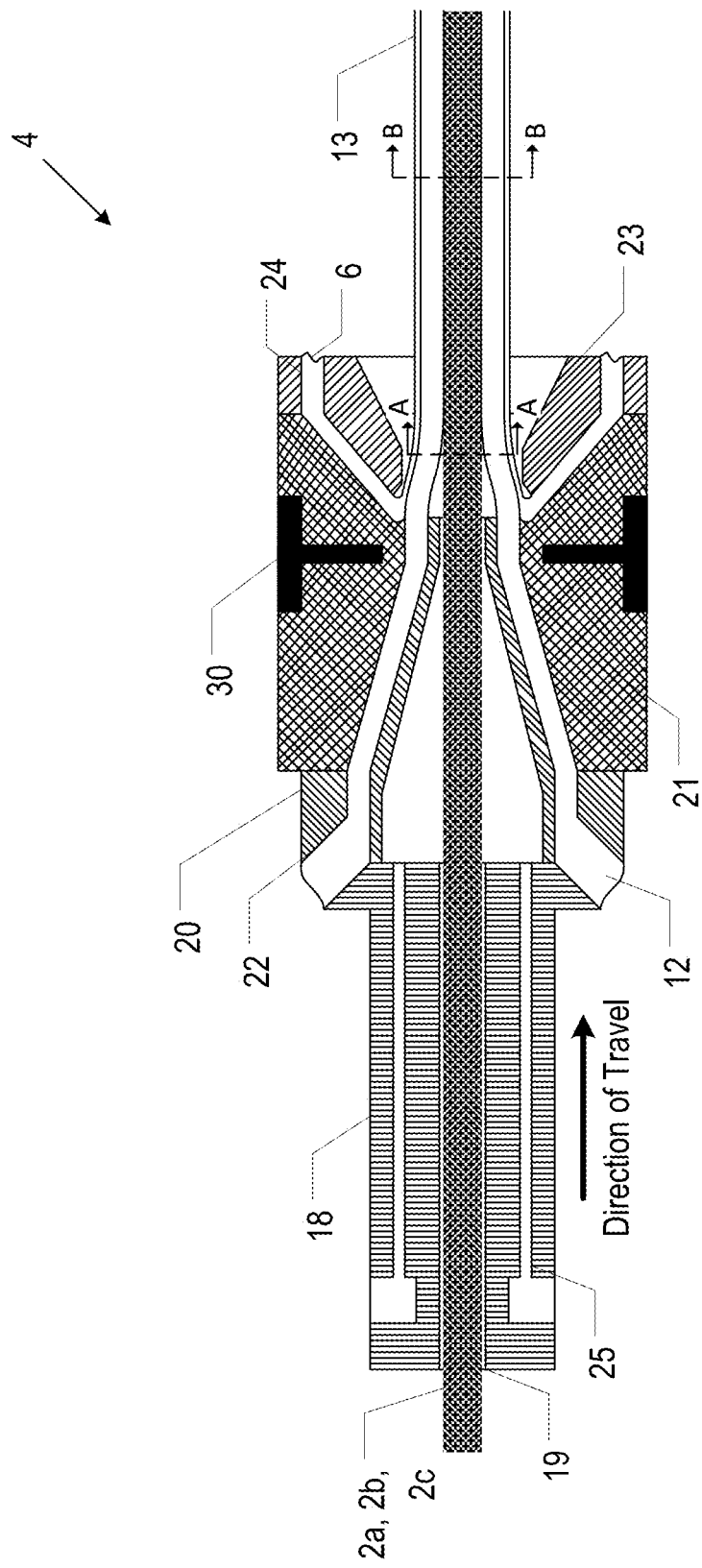
FIG. 2 shows an exemplary schematic of various components present within an extruder head, according to one embodiment of the present invention.

Referring now to FIG. 2, the extruder head 4 may comprise a plurality of individual components each configured to facilitate the extrusion of the first sheath layer 27 and second sheath layer 26 onto the multiple conductors 2*a*, 2*b*, 2*c*. In various embodiments, the extruder head 4 may comprise a tip holder 18 having a guide channel 19 extending therethrough. In various embodiments, the guide channel 19 may be sized and shaped such that the multiple conductors 2*a*, 2*b*, 2*c* maintain a predefined orientation as the multiple conductors 2*a*, 2*b*, 2*c* are passed through the extruder head 4. As a non-limiting example, the guide channel 19 may be in a substantially stadium or flat oval shape such that the multiple conductors 2*a*, 2*b*, 2*c* each having a round profile and maintain a nominally flat orientation, such that the center points of each of the multiple conductors 2*a*, 2*b*, 2*c* remain in a single plane. The tip holder 18 may also include one or more vacuum channels 25 extending from the downstream end of the tip holder 18 to a vacuum connection point located in the side of the tip holder 18.

The downstream end of the tip holder 18 may be in contact with an insulator-applicator tip 20. The exterior surface of the insulator applicator tip 20 may be configured to guide molten insulator material 12 into a circular shape around the multiple conductors 2*a*, 2*b*, 2*c*. As a non-limiting example, the exterior surface of the insulator-applicator tip 20 may have a round cross-section. In various embodiments, at least a portion of the exterior surface of the insulator-applicator tip 20 may be substantially frustoconical in shape, such that molten insulator material 12 is guided from a large diameter first end of the insulator-applicator tip 20 to a small diameter second end of the insulator-applicator tip.

The interior surface of the insulator-applicator tip 20 is configured to accept input through the guide channel 19 and the one or more vacuum channels 25. As a non-limiting example, at least a portion of the interior surface of insulator-applicator tip 20 may be at least in part frustoconical in shape, and the second end of the insulator-applicator tip may comprise an exit channel configured to guide the multiple conductors 2*a*, 2*b*, 2*c* through the extrusion head 4. In various embodiments, the exit channel may have at least substantially the same shape as the guide channel 19, such that the orientation of the multiple conductors 2*a*, 2*b*, 2*c* is maintained throughout the extrusion head.

In various embodiments, an insulator material guide (not shown) may be provided near the first end of the insulator-applicator tip 20. The insulator material guide may be configured to direct the molten insulator material 12 onto the exterior surface of the insulator-applicator tip 20 such that an at least substantially uniform flow rate of molten insulator material is provided around the entire circumference of the exterior surface of the insulator-applicator tip.

As installed in the extruder head 4, the second end of the insulator-applicator tip 20 may reside within a first interior portion of an isolator tip 21, the first interior portion of the isolator tip being located on the upstream side of the isolator tip. The exterior surface of the insulator-applicator tip 20 may be spaced away from the first interior surface of the isolator tip 21, such that an insulator channel 22 is formed therebetween.

A second interior portion of the isolator tip 21, located at the downstream side of the isolator tip, may be spaced apart from an exterior surface of a secondary tip 23. In various embodiments, a polyamide channel 24 is formed between the second interior surface of the isolator tip 21 and the exterior surface of the secondary tip 23. As illustrated in FIG. 2, the direction of flow of the polyamide 6 (or a combination of polyamide 6 and additive composition 9) along the polyamide channel 24 may be at least partially opposite the direction of flow of the multiple conductors 2a, 2b, 2c. Therefore, in various embodiments, the second interior surface of the isolator tip 21 may include a redirection portion configured to redirect the molten polyamide into the direction of travel of the multiple conductors 2a, 2b, 2c. In various embodiments, a polyamide guide (not shown) may be provided near an entrance to the polyamide channel 24. The polyamide guide may be configured to direct the molten polyamide 6 into the polyamide channel 24 such that an at least substantially uniform flow rate of molten polyamide (or combination of polyamide 6 and additive composition 9) is provided around the entire circumference of the exterior surface of the secondary tip.

In various embodiments, the extruder head 4 may additionally comprise a heat sink 30 positioned between the insulator channel 22 and polyamide channel 24. Because the polyamide 6 (or combination of polyamide 6 and additive composition 9) may be extruded at a temperature higher than the extrusion temperature of the insulator material 12, the heat sink 30 is configured to prevent the extruder head 4 components adjacent to the insulator material channel 22 from reaching a temperature substantially higher than the insulator material extrusion temperature. In various embodiments, the heat sink 30 may be provided as a metallic ring positioned within a slot formed in the exterior of the isolator tip 21. The metallic material may be different from the material of the remaining components of the extruder head 4 and have high thermal conductivity. As a non-limiting example, the heat sink 30 may comprise a copper material. The heat sink 30 may, in various embodiments, be configured to conduct heat away from the extrusion head 4 and into a second heat sink (not shown) positioned external to the extruder head 4.

Although the various components of the extruder head 4 are illustrated and described herein as having an interior surface and an exterior surface, such terms should not be construed as limiting. As will be understood by those skilled in the art, various embodiments may have alternative orientations. As a non-limiting example, at least one of the insulator channel 22 and the polyamide channel 24 may be oriented such that the respective material flows may be in a direction substantially different from that described herein, with respect to the direction of flow of the multiple conductors 2a, 2b, 2c.

Extrusion Process

Referring now to FIGS. 2, 2A-A and 2B-B, which illustrate a coextrusion process for extruding an outer sheath layer onto the multiple conductors 2a, 2b, 2c, a process for producing an electrical cable according to various embodiments of the present invention will now be described. Such process may be performed continuously, such that a long cable having at least substantially uniform physical properties along the entire length of the cable may be produced. Although FIG. 2 illustrates a coextrusion process, as will be understood by those skilled in the art, a tandem extrusion process may also be used to produce an electrical cable. In various embodiments, the multiple conductors 2a, 2b, 2c may be fed into an upstream end of the extruder head 4, and into a tip holder 18. When being fed into the upstream end of the extruder head 4, the multiple conductors 2a, 2b, 2c may be in a nominally flat configuration, such that a center point of each of the multiple conductors 2a, 2b, 2c are aligned within a single plane. In various embodiments, the multiple conductors 2a, 2b, 2c may be fed through the guide channel 19 extending along the length of the tip holder 18.

Upon exiting the tip holder 18, the multiple conductors 2a, 2b, 2c may enter an interior portion of an insulator-applicator tip 20. Molten insulator material 12 is concurrently fed through the insulator channel 22 at a rate such that the insulator material 12 forms a first sheath layer 27 having an at least substantially circular cross section and a uniform, predefined thickness at substantially the same rate that the multiple conductors 2a, 2b, 2c are fed into the extruder head 4. In preferred embodiments, PVC, heated to a temperature of at least 350 degrees Fahrenheit, may be fed through the insulator channel 22 and extruded using a tube extrusion method around the multiple conductors 2a, 2b, 2c to form a first sheath layer 27. In various embodiments, the first sheath layer 27 may have an at least substantially circular cross section surrounding the multiple conductors 2a, 2b, 2c.

As the multiple conductors 2a, 2b, 2c and first sheath layer 27 are fed into the secondary tip 23, polyamide 6 is concurrently fed through the polyamide channel 24 and onto the surface of the first sheath layer 27, thus forming a second sheath layer 26 thereon. In various embodiments, the polyamide 6 may be combined with an additive composition 9 prior to introduction into the extruder head 4, such that the mixture is extruded to form the second sheath layer 26. The polyamide 6 and additive composition 9 may be fed through the polyamide channel 24 at a rate such that the polyamide and additive composition mixture forms a second sheath layer 26 having a predefined thickness at substantially the same rate that the multiple conductors 2a, 2b, 2c are fed into the extruder head 4. In preferred embodiments, polyamide 6 may be heated to a temperature of at least 500 degrees Fahrenheit and fed through the polyamide channel 24 and extruded onto the exterior surface of the first sheath layer 27 to form the second sheath layer 26. The molten polyamide 6 is extruded onto the surface of the first sheath layer 27, and as the first sheath layer and the polyamide 6 cool, they may mechanically bond together. The resulting combination of the first sheath layer 27 and second sheath layer 26 may have an at least substantially circular cross section surrounding the multiple conductors 2a, 2b, 2c.

The molten polyamide 6 (or combination of polyamide 6 and additive composition 9) may have a low viscosity at the polyamide extrusion temperature. As a predictable, uniform flow rate of molten polyamide around the perimeter of an oval die slot could not be achieved using conventional polyamide extrusion parameters. As a non-limiting example, extruding molten polyamide through a non-circular extrusion die exit to form a second sheath layer 26 may cause an uneven flow rate in the molten polyamide around the perimeter of the extrusion die and thus cause an uneven flow rate in the extrusion direction. Therefore, the resulting second sheath layer 26 may have an inconsistent (non-uniform) thickness around the perimeter of the second sheath layer. However, utilizing an extruder head 4 incorporating a polyamide channel 24 having a circular exit facilitates a uniform flow rate around the perimeter of the circular exit, and the resulting second sheath layer 26 therefore has an at least substantially uniform thickness around the perimeter of the second sheath layer.

As the multiple conductors 2a, 2b, 2c, the first sheath layer 27, and the second sheath layer 26 exit the secondary tip 23, the combination of the first sheath layer 27 and second sheath layer 26 maintains an at least substantially circular cross section with a uniform thickness, while the multiple conductors 2a, 2b, 2c maintain a nominally flat orientation. A cross section showing the relative configurations of the multiple conductors 2a, 2b, 2c, the first sheath layer 27, and the second sheath layer 26 are shown in FIG. 2A-A. As illustrated in FIG. 2A-A, the first sheath layer 27 and second sheath layer 26 each have a uniform thickness around the perimeter of the cross section.

While the multiple conductors 2a, 2b, 2c are fed through the extruder head 4, a negative pressure is applied through the one or more vacuum channels 25 located within the tip holder 18. The negative pressure may be applied in the form of a vacuum, and may be configured such that the combined first sheath layer 27 and second sheath layer 26 are pulled onto the surface of the multiple conductors 2a, 2b, 2c at some distance downstream from the exit of the polyamide channel 24. FIG. 2B-B shows a cross sectional view of an exemplary resulting cable 13, wherein the outer sheath layer has a stadium shape surrounding the multiple conductors 2a, 2b, 2c. As illustrated in FIG. 2B-B, the first sheath layer 27 and second sheath layer 26 of the resulting cable 13 each have a uniform thickness around the perimeter of the cable. A cutaway view of the resulting cable 13 according to various embodiments is shown in FIG. 3A.

Although not illustrated in FIG. 1 or FIG. 2, a dam paper 28 may be fed through the extruder head 4 with the multiple conductors 2a, 2b, 2c. As will be understood by those skilled in the art, the dam paper 28 may be folded around the multiple conductors 2a, 2b, 2c, prior to the multiple conductors entering the tip holder 18. Moreover, at least one conductor 2b may be individually enclosed in a paper barrier 29 prior to being introduced to the extruder head 4. As will be understood by those skilled in the art, the paper barrier 29 may be folded around the at least one conductor 2b prior to the at least one conductor entering the extruder head 4.

Non-Circular Electrical Cable Having a Reduced Pull Force

Figure 3:
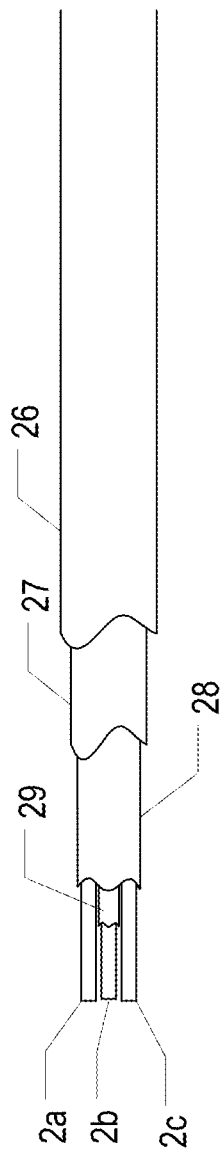
FIG. 3 shows a cutaway view of a sheathed cable according to one embodiment of the present invention.

The resulting cable 13 produced according to the above described methods will now be described with reference to FIG. 3. Referring now to FIG. 3, the multiple conductors 2a, 2b, 2c, may be loosely enclosed within a dam paper 28 in a nominally flat orientation, and thus the resulting cable 13 may have a nominally flat shape. Although surrounding the multiple conductors 2a, 2b, 2c such that the dam paper 28 is in contact with the surface of each of the multiple conductors, the dam paper may not be mechanically bonded to the multiple conductors. The combination of the multiple conductors 2a, 2b, 2c and dam paper 28 are enclosed in the outer sheath comprising the first sheath layer 27 and the second sheath layer 26. As described herein, the exterior surface of the first sheath layer 27 may be mechanically bonded to the interior surface of the second sheath layer 26. In various embodiments, the mechanical bond between the first sheath layer 27 and the second sheath layer 26 may be a heat bond that may be formed as the molten polyamide 6 is extruded onto the surface of the first sheath layer 27. The outer sheath may be in contact with the dam paper 28, although the outer sheath may not be mechanically bonded thereto, such that the outer sheath may loosely enclose the dam paper 28 and multiple conductors 2a, 2b, 2c while having a nominally flat cross section corresponding to the nominally flat orientation of the multiple conductors 2a, 2b, 2c. As a non-limiting example, where the multiple conductors 2a, 2b, 2c are arranged such that the center points of each of the multiple conductors are within a single plane, the outer sheath may have a stadium-shape or flat oval cross section. Moreover, in various embodiments, a bare conductor 2b may be individually enclosed in a paper barrier 29. In various embodiments, the resulting cable does not comprise a dam paper 28, such that the interior surface of the first sheath layer 27 may be in contact with the exterior surface of the multiple conductors 2a, 2b, 2c. In such configurations, the first sheath layer 27 may not be mechanically bonded to the exterior surface of the multiple conductors 2a, 2b, 2c.

In various embodiments, each of the first sheath layer 27 and second sheath layer 26 may have a substantially uniform thickness around the perimeter of the cable (see FIG. 2B-B). For example, the thickness of the second sheath layer 26 may have a 40% tolerance, and more preferably a 20% tolerance, and even more preferably a 17% tolerance. In various embodiments, such a tolerance may correspond to a 2 mil tolerance, and more preferably a 1 mil tolerance around the perimeter of the cable 13. For example, such a tolerance may correspond to a second sheath layer thickness of 6 mils+/−1 mil or 6 mils+/−0.5 mils. As yet other non-limiting examples, such a tolerance may correspond to a second sheath layer thickness of 4 mils+/−1 mil or a second sheath layer thickness of 5 mils+/−1 mil. Similarly, the thickness of the first sheath layer 27 may have a 10% tolerance, and more preferably an 8.25% tolerance. Such a tolerance may correspond to a first sheath layer thickness of 24 mils+/−0.5 mils or a first sheath layer thickness of 24 mils+/−1 mil.

The overall thickness of the combination of the outer sheath and dam paper 28 (if included) may be sufficient to satisfy applicable regulatory requirements or standards established by industry groups (e.g., the Underwriters Laboratory) or other reviewing entities. Alternatively, the outer sheath alone may have a thickness sufficient to satisfy applicable regulatory requirements or standards. As a non-limiting example, the overall thickness of the combination of the outer sheath and the dam paper 28 may be at least 30 mils. Specifically, the second barrier layer 26 may have a thickness between 5-8 mil, but preferably 6 mil, the first barrier layer 27 may have a thickness between 23-25 mil, but preferably 24 mil, and the dam paper 28 may have a thickness of 4 mil. Moreover, as illustrated in detail below, the second sheath layer 26 may have a low dynamic coefficient of friction, and thus a low pulling force is necessary for installation of the cable 13 in an installation site.

Pulling Force Test Apparatus, Methods, and Results

Figure 4A:
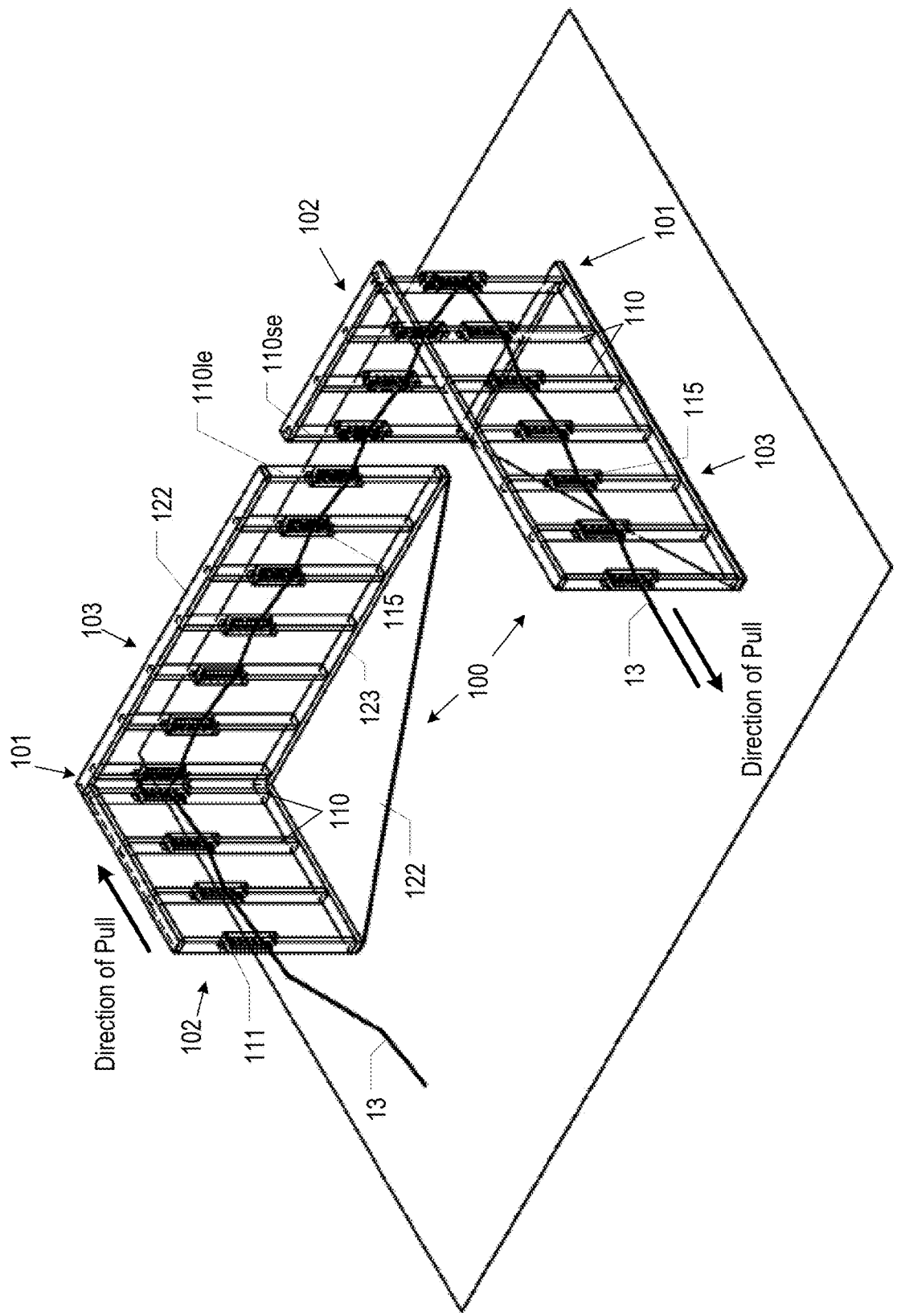
FIGS. 4A and 4B show components of a pull force test apparatus according to various embodiments of the present invention.
Figure 4B:
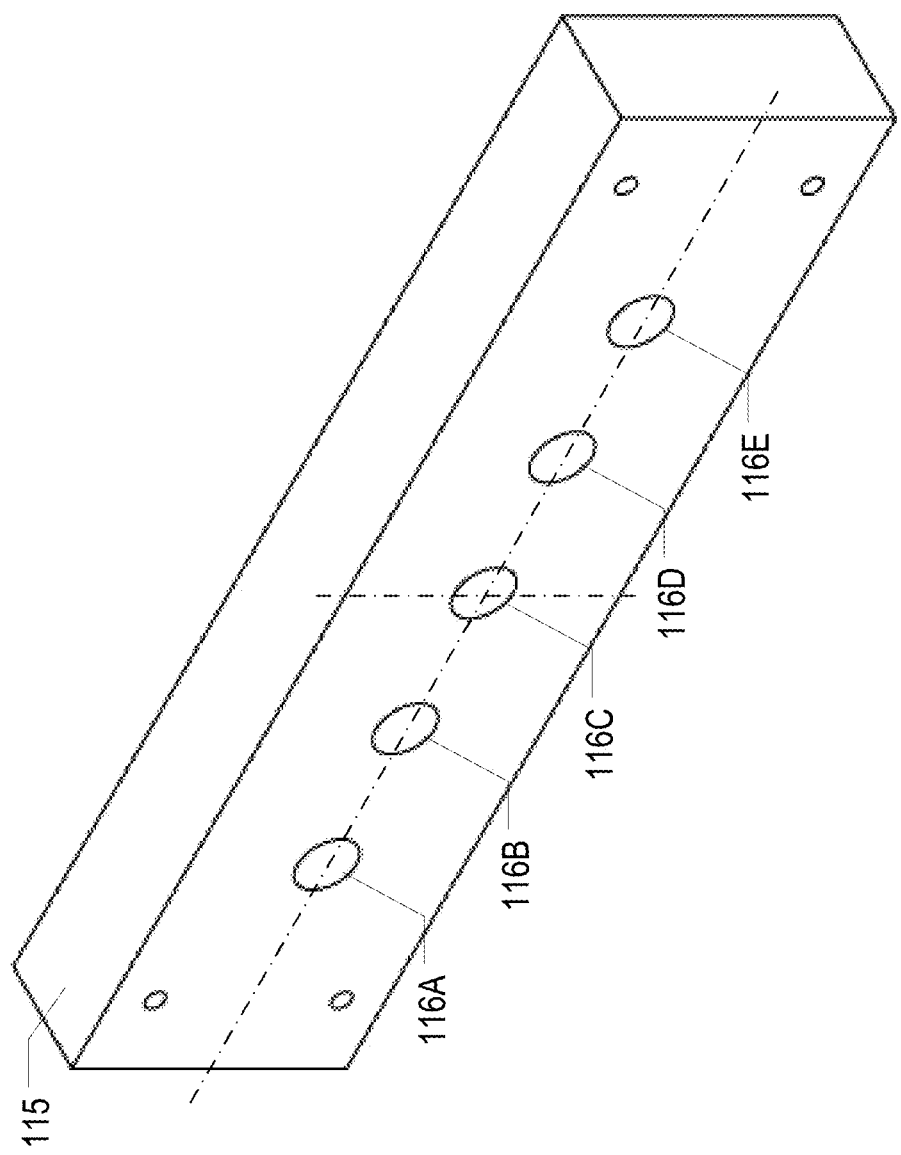

FIGS. 4A and 4B illustrate various components of a pull-force test apparatus that was used to determine the effects on necessary pulling force of incorporating a second sheath layer 26 as described herein into a cable. As illustrated in FIG. 4A, the test apparatus comprises two identical test walls 100 each comprising a 90° corner 101, aligned to form a "U" shape. Each test wall 100 comprises a short wall section 102 and a long wall section 103 adjacent the corner 101. The short wall section comprises 4 vertical studs 110, and the long wall section comprises 7 vertical studs 110. Each of the studs 110 is supported by a support structure comprising a base 121, a top plate 122 and a sole plate 123 collectively configured to maintain the spacing and orientation of the studs 110 relative to one another.

Each stud 110 comprises a 1½" by 3½" soft pine board, commonly referred to as a "2×4." The studs 110 are spaced on 16-inch centers (i.e., spaced such that a 16" long space exists between the centerline of each stud), and aligned such that the wide-sides (i.e., 3½" sides) of adjacent studs 110 are in parallel planes. Each stud has a 10" tall by 1" wide, stadium shaped test slot 111 extending therethrough in a direction perpendicular to the orientation of the 3½" side of the stud 110. The vertical centerline of the slot is aligned with the vertical centerline of each corresponding stud 110.

The studs 110 are each configured to support a pulling block 115 as illustrated in FIG. 4B. Each pulling block comprises a 1½" by 3½" soft pine board having five, ¾" diameter test holes 116A-116E extending therethrough in a direction perpendicular to the orientation of the 3½" side of the pulling block 115. The test holes 116A-116E are arranged on 2" centers (e.g., spaced such that a 2" long space exists between the center point of each test hole) and aligned such that the centerline of the 3½ inch side of the pulling block 115 extends through the center point of all five test holes 116A-116E. Moreover, the center point of the center test hole 116C is concentric with the center point of the 3½ inch side of the pulling block 115.

When mounted on a stud 110, the center point of the center test hole 116C of the pulling blocks 115 is concentric with the center point of the test slot 111 of the stud 110. In the illustrated embodiment of FIGS. 4A and 4B, the pulling blocks 115 are each attached to a corresponding stud 110 using bolts secured through corresponding mounting holes of the pulling blocks 115 and studs 110. For each section 102, 103 of the test wall 100, the pulling blocks 115 are mounted to the studs such that the pulling blocks 115 are spaced on 16" centers (i.e., the pulling blocks 115 each have the same orientation relative to the corresponding studs 110 in relation to the corner 101). Moreover, the pulling blocks 115 are mounted to corresponding studs 110 such that each pulling block 115 is closer to the corner 101 than the corresponding stud 110. In such orientation, the pulling blocks 115 nearest to the corner 101 on each section 102, 103 are adjacent.

The two test walls 100 are arranged in a "U" shape, such that the short section 102 of a first test wall 100 is parallel with the long section 103 of a second test wall 100, and the long section 103 of the first test wall 100 is proximate the short section 102 of the second test wall 100. As arranged, the long section 103 of the first test wall 100 and the short section 102 of the second test wall 100 collectively form an 11-stud wall section. The stud 110/e forming the end of the long section 103 of the first test wall 100 is spaced apart from the stud 110se forming the end of the short section 102 of the second test wall 100 such that the pulling blocks 115 associated with the studs 110/e, 110se are arranged on a 16" center.

Figure 4C:
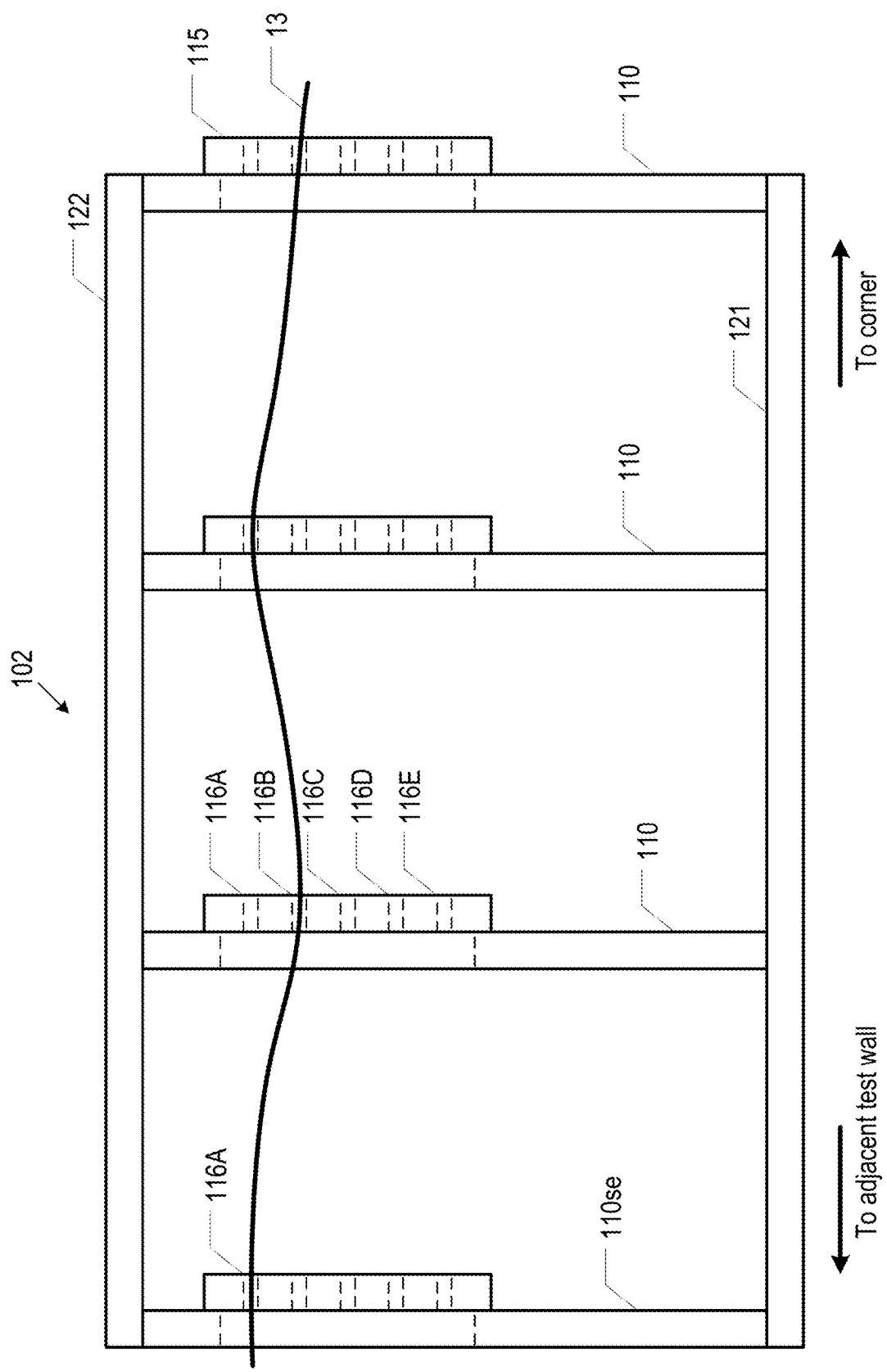
FIG. 4C illustrates a threading pattern for threading a cable to be tested using the testing apparatus according to various embodiments of the present invention.

A section of cable to be tested is threaded through test holes in adjacent pulling blocks 115 through the entire "U"-shaped test apparatus. FIG. 4C is a schematic diagram of a short section 102 of a test wall 100 illustrating how a cable 13 is threaded through the test apparatus. As shown in FIG. 4C, the cable 13 is threaded through alternating test holes 116A-B. In the illustrated example, the cable 13 is threaded through a top-level test hole 116A of a first pulling block 115, then a second-level test hole 116B of a second, adjacent pulling block 115, then a top-level test hole 116A of a third, adjacent pulling block 115. This alternating threading pattern is repeated over the entirety of the test apparatus. FIG. 4C illustrates only a subsection of the entirety of the test apparatus, however the same alternating threading pattern shown in FIG. 4C is repeated throughout the entire test apparatus. The cable 13 is threaded through a pattern of adjacent-level test holes, however any threading pattern utilizing adjacent pattern test holes may be used. As illustrated, the cable may be threaded through holes 116A and 116B, although the cable may alternatively be threaded through holes 116B and 116C; holes 116C and 116D; or holes 116D and 116E. During testing, each test hole is utilized for a single test before the pulling blocks 115 are discarded and replaced.

The cable 13 is pulled through the test apparatus in a test direction from an entrance side to an exit side. A length of cable at least equal in length to the length of cable to be tested is unspooled on the entrance side, such that any increased pulling force attributable to the cable being removed from the spool is minimized. The cable extending beyond the exit side of the test apparatus is secured to a 500-lb load cell (e.g., a Smart S-beam parallel/shear beam load cell), which is secured via a rope to a cable tugger (not shown) located 12 feet away from the exit end of the test apparatus and oriented such that the cable 13 is pulled at least substantially horizontally between the exit side of the test apparatus and the cable tugger. The load cell is in electrical communication with a data recording device (e.g., a computing device) configured to record the amount of force measured by the load-cell. Other load cells, such as a 20-lb Smart S-beam parallel/shear beam load cell, may also be used in the test.

During testing, the cable tugger applies a pulling force to the cable 13 sufficient to pull the cable through the testing apparatus at a uniform rate until a 10-foot long length of cable 13 has been pulled through the test apparatus. The load cell measures the amount of pulling force applied by the cable tugger, and communicates the data to the data recording device. For each test sample type, 3 samples were tested by pulling a 10-foot long length of cable 13 through the test apparatus using the same set of holes in the pulling blocks 115. Using the same set of holes in the pulling blocks 115 substantially recreates the effect of pulling a single long test sample through the testing apparatus. Thus, as additional test samples are pulled through the holes in the pulling blocks 115, the pulling force necessary to pull the sample through the test apparatus decreases. This decrease in necessary pulling force may be attributable to a smoothing of the interior of the holes of the pulling blocks 115 as cable is pulled across the surfaces of the holes, or it may be attributable to residual lubricant being deposited on the surface of the holes of the pulling blocks 115. The amount of force measured by the load cell during each measurement point of the 3 tests for each sample type is averaged to determine an average pulling force necessary to pull the cable through the test apparatus.

The pull test was performed on several 12/2 NM-B cable samples including cables marketed by various companies, cables produced without a second sheath layer 26 as discussed herein, and cables having various levels of additives incorporated into the sheath layer 26. The results of the pull test are summarized in Table 1. These results illustrate that a cable having a second sheath layer 26 as discussed herein requires significantly less pulling-force to install than similar NM-B cables that do not have a second sheath layer 26.

TABLE 1

| Sample Type | Measured Average Pulling Force (lb.) |
| --- | --- |
| Company 1 "12/2" cable without a second sheath layer | 36.3 |
| Company 2 "12/2" cable without a second sheath layer | 64.5 |
| Company 3 "12/2" cable without a second sheath layer | 48.0 |
| "12/2" Test Sample 1 having a nylon second sheath layer without flame retardant additive and with 12% composition of silicon lubricant | 19.0 |
| "12/2" Test Sample 2 having a nylon second sheath layer with 5% composition of flame retardant additive and with 12% composition of silicon lubricant | 18.0 |
| "12/2" Test Sample 3 having a nylon second sheath layer with a 10% composition of flame retardant additive and with 12% composition of silicon lubricant | 17.5 |

As shown in Table 1, the test samples having a nylon second sheath layer required at least 48% less pulling force than the nearest comparable cable to pull the cable through the test apparatus.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An extruder head for extruding an exterior sheath of a non-round electrical cable, the extruder head comprising:
   a non-circular guide channel extending through the extruder head to guide one or more conductors along a conductor path through the extruder head between a first end and a downstream second end of the extruder head;
   a first extrusion channel defining a first circular exit located between the first end and the downstream second end of the conductor path, wherein the first extrusion channel is configured for extrusion of a first sheath material into a circular first extrusion having a uniform thickness surrounding the conductor path;
   a second extrusion channel defining a second circular exit, wherein the second extrusion channel is configured for extrusion of a second sheath material onto an exterior surface of the circular first extrusion to form a two-layer circular extrusion having a uniform thickness around the conductor path; and
   one or more vacuum channels located upstream of the first circular exit along the conductor path, wherein the one or more vacuum channels are configured to apply a negative pressure to an interior surface of the circular first extrusion of the two-layer circular extrusion to pull the two-layer circular extrusion into a two-layer non-circular sheath having a non-circular cross sectional shape around the one or more conductors at a location downstream of the second circular exit.

2. The extruder head of claim 1, further comprising a tip holder defining the first end of the extruder head, an insulator applicator tip, an isolator tip, and a secondary tip defining the downstream second end of the extruder head.

3. The extruder head of claim 2, wherein the first extrusion channel is defined between the insulator applicator tip and the isolator tip.

4. The extruder head of claim 3, wherein the second extrusion channel is defined between the isolator tip and the secondary tip.

5. The extruder head of claim 4, wherein a downstream end of the isolator tip defines an exit channel along the conductor path, wherein the exit channel has a non-circular cross-section.

6. The extruder head of claim 1, wherein the second extrusion channel extends through a downstream end of the extruder head, such that the second sheath material flows into the extruder head from the downstream end.

7. The extruder head of claim 1, wherein the first extrusion channel has a frusto-conical shape having a larger, upstream diameter and a small, downstream diameter at the first circular exit.

8. The extruder head of claim 1, wherein the non-circular guide channel is configured to maintain a plurality of conductors in a substantially flat orientation while passing through the extruder head.

9. The extruder head of claim 8, wherein the non-circular guide channel is configured to maintain a first conductor, a second conductor, and a ground wire in the substantially flat orientation.

10. The extruder head of claim 8, wherein the non-circular guide channel is configured to maintain the plurality of conductors wrapped in a dam paper in the substantially flat orientation while passing through the extruder head.

11. The extruder head of claim 1, further comprising a heat sink positioned between the first extrusion channel and the second extrusion channel to thermally insulate the first extrusion channel from the second extrusion channel.

* * * * *